US011302033B2

(12) United States Patent
Ding et al.

(10) Patent No.: US 11,302,033 B2
(45) Date of Patent: Apr. 12, 2022

(54) CLASSIFYING COLORS OF OBJECTS IN DIGITAL IMAGES

(71) Applicant: Adobe Inc., San Jose, CA (US)

(72) Inventors: Zhihong Ding, Fremont, CA (US); Scott Cohen, Sunnyvale, CA (US); Zhe Lin, Fremont, CA (US); Mingyang Ling, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 10 days.

(21) Appl. No.: 16/518,795

(22) Filed: Jul. 22, 2019

(65) Prior Publication Data

US 2021/0027497 A1 Jan. 28, 2021

(51) Int. Cl.
*G06T 7/90* (2017.01)
*G06K 9/32* (2006.01)
*G06K 9/62* (2006.01)
*G06N 3/02* (2006.01)
*G06V 10/20* (2022.01)

(52) U.S. Cl.
CPC .............. *G06T 7/90* (2017.01); *G06K 9/6215* (2013.01); *G06K 9/6267* (2013.01); *G06N 3/02* (2013.01); *G06V 10/255* (2022.01); *G06T 2207/10024* (2013.01); *G06T 2207/20084* (2013.01)

(58) Field of Classification Search
None
See application file for complete search history.

(56) References Cited

U.S. PATENT DOCUMENTS

| 6,389,168 B2 | 5/2002 | Altunbasak et al. |
| 6,469,706 B1 | 10/2002 | Syeda-Nahmood |
| 8,107,726 B2 | 1/2012 | Xu et al. |
| 8,385,688 B2 | 2/2013 | Gong et al. |
| 8,818,024 B2 | 8/2014 | Chen et al. |
| 9,129,191 B2 | 9/2015 | Cohen et al. |
| 9,171,230 B2 | 10/2015 | Jiang et al. |
| 9,576,223 B2 | 2/2017 | Aupetit et al. |
| 9,619,488 B2 | 4/2017 | Ambardekar et al. |
| 9,720,934 B1 | 8/2017 | Dube et al. |

(Continued)

FOREIGN PATENT DOCUMENTS

| CN | 103366178 A | 10/2013 |
| CN | 107563494 A | 1/2018 |

(Continued)

OTHER PUBLICATIONS

Gouet, Valérie, and Nozha Boujemaa. "Object-based queries using color points of interest." Proceedings IEEE Workshop on Content-Based Access of Image and Video Libraries (CBAIVL 2001). IEEE, 2001. (Year: 2001).*

(Continued)

*Primary Examiner* — Andrae S Allison
(74) *Attorney, Agent, or Firm* — Keller Preece PLLC

(57) ABSTRACT

The present disclosure relates to a color classification system that accurately classifies objects in digital images based on color. In particular, in one or more embodiments, the color classification system utilizes a multidimensional color space and one or more color mappings to match objects to colors. Indeed, the color classification system can accurately and efficiently detect the color of an object utilizing one or more color similarity regions generated in the multidimensional color space.

20 Claims, 16 Drawing Sheets

(56) References Cited

U.S. PATENT DOCUMENTS

| | | | |
|---|---|---|---|
| 9,746,981 B2 | 8/2017 | Zachut et al. | |
| 9,858,496 B2 | 1/2018 | Sun et al. | |
| 10,146,751 B1 | 12/2018 | Zhang | |
| 10,192,129 B2 | 1/2019 | Price et al. | |
| 10,216,766 B2 | 2/2019 | Lin et al. | |
| 10,496,880 B2 | 12/2019 | Ye | |
| 10,713,794 B1 | 7/2020 | He et al. | |
| 10,740,647 B2 | 8/2020 | Du et al. | |
| 10,893,283 B2 | 1/2021 | Chen et al. | |
| 11,182,408 B2 | 11/2021 | Wu et al. | |
| 2003/0179213 A1* | 9/2003 | Liu | G06K 9/6282 |
| | | | 345/619 |
| 2003/0198380 A1* | 10/2003 | Shin | G06F 16/5838 |
| | | | 382/165 |
| 2003/0233224 A1 | 12/2003 | Marchisio et al. | |
| 2008/0069444 A1 | 3/2008 | Wilensky | |
| 2009/0281925 A1* | 11/2009 | Winter | G06F 16/5838 |
| | | | 705/26.1 |
| 2010/0158412 A1* | 6/2010 | Wang | G06K 9/00624 |
| | | | 382/305 |
| 2010/0166321 A1* | 7/2010 | Sawant | G06K 9/522 |
| | | | 382/209 |
| 2011/0026835 A1* | 2/2011 | Ptucha | G06F 16/583 |
| | | | 382/209 |
| 2011/0029553 A1* | 2/2011 | Bogart | G06F 16/58 |
| | | | 707/769 |
| 2011/0085739 A1* | 4/2011 | Zhang | G06F 16/583 |
| | | | 382/218 |
| 2011/0216973 A1 | 9/2011 | Mojsilovic | |
| 2013/0257886 A1* | 10/2013 | Kerofsky | G06T 5/007 |
| | | | 345/589 |
| 2014/0334722 A1* | 11/2014 | Bloore | G06K 9/4652 |
| | | | 382/164 |
| 2015/0169142 A1 | 6/2015 | Longo et al. | |
| 2015/0170005 A1 | 6/2015 | Cohen et al. | |
| 2015/0213058 A1 | 7/2015 | Ambardekar et al. | |
| 2015/0228086 A1* | 8/2015 | Maurer | H04N 5/232945 |
| | | | 382/100 |
| 2015/0379006 A1* | 12/2015 | Dorner | G06F 16/58 |
| 2016/0342863 A1* | 11/2016 | Kwon | G06F 16/5854 |
| 2017/0017696 A1 | 1/2017 | Alonso | |
| 2017/0083752 A1 | 3/2017 | Saberian et al. | |
| 2017/0140236 A1 | 5/2017 | Price et al. | |
| 2017/0206431 A1 | 7/2017 | Sun et al. | |
| 2017/0255378 A1* | 9/2017 | Desai | G06F 3/04845 |
| 2017/0277948 A1 | 9/2017 | Dhua et al. | |
| 2017/0287137 A1 | 10/2017 | Lin et al. | |
| 2018/0108137 A1 | 4/2018 | Price et al. | |
| 2018/0267997 A1 | 9/2018 | Lin et al. | |
| 2019/0019318 A1 | 1/2019 | Cinnamon et al. | |
| 2019/0108250 A1* | 4/2019 | Miller | H04L 69/28 |
| 2019/0130229 A1 | 5/2019 | Lu et al. | |
| 2019/0252002 A1 | 8/2019 | Ding et al. | |
| 2019/0354609 A1 | 11/2019 | Huang et al. | |
| 2020/0020108 A1 | 1/2020 | Pao et al. | |
| 2020/0218931 A1 | 7/2020 | Karlinsky et al. | |
| 2020/0250538 A1 | 8/2020 | Li et al. | |
| 2020/0334487 A1 | 10/2020 | Du et al. | |
| 2020/0334501 A1 | 10/2020 | Lin et al. | |
| 2021/0027448 A1 | 1/2021 | Cohen et al. | |
| 2021/0027471 A1 | 1/2021 | Cohen et al. | |
| 2021/0192375 A1 | 6/2021 | Xia et al. | |

FOREIGN PATENT DOCUMENTS

| | | |
|---|---|---|
| EP | 3 300 024 A1 | 3/2018 |
| WO | WO 2017/007626 A1 | 1/2017 |

OTHER PUBLICATIONS

Wang, Jiang, et al. "Learning fine-grained image similarity with deep ranking." Proceedings of the IEEE Conference on Computer Vision and Pattern Recognition. 2014. (Year: 2014).*

Niblack, Carlton Wayne, et al. "QBIC project: querying images by content, using color, texture, and shape." Storage and retrieval for image and video databases. vol. 1908. International Society for Optics and Photonics, 1993. (Year: 1993).*

Wan et al, Deep Learning for Content-Based Image Retrieval: Comprehensive Study, Published in MM '14: Proceedings of the ACM International Conference on Multimedia: Nov. 3-7, 2014, Orlando, pp. 157-166. http://doi.org/10.1145/2647868.2654948 (Year: 2014).*

Combined Search and Examination Report as received in United Kingdom Application GB2005714.7 dated Sep. 3, 2020.

Ning Xu et al., "Deep GrabCut for Object Selection," published Jul. 14, 2017.

S. Ren, K. He, R. Girshick, and J. Sun, Faster r-cnn: Towards real-time object detection with region proposal networks, NIPS, 2015.

Yi-Hsuan Tsai et al., "Sky is Not the Limit: Semantic-Aware Sky Replacement," ACM Transactions on Graphics (SIGGRAPH), 2016.

Yufei Wang et al., "Concept Mask: Large-Scale Segmentation from Semantic Concepts," The European Conference on Computer Vision (ECCV), Aug. 18, 2018.

Intention to Grant as received in United Kingdom Application GB1817588.5 dated Aug. 13, 2020.

U.S. Appl. No. 15/921,492, filed Apr. 2, 2020, Notice of Allowance.

Combined Search and Examination Report as received in United Kingdom Application GB2005704.8 dated Sep. 24, 2020.

Combined Search and Examination Report as received in United Kingdom Application GB2004362.6 dated Nov. 13, 2020.

J. Uijlings, K. van de Sande, T. Gevers, and A. Smeulders. Selective Search For Object Recognition, IJCV, 2013.

Joseph Redmon, Santosh Divvala, Ross Girshick, Ali Farhadi: You Only Look Once: Unified, Real-Time Object Detection, arXiv:1506.02640, May 6, 2016.

Bency, Archith John, et al. "Weakly supervised localization using deep feature maps." European Conference on Computer Vision. Springer, Cham, 2016, See Abstract and section 3.4.

Bolanos, Marc, and Petia Radeva. "Simultaneous food localization and recognition." 2016 23rd International Conference on Pattern Recognition (ICPR). IEEE, 2016 See Abstract, Figure 3 and the Methodology section.

Combined Search and Examination Report as received in United Kingdom Application GB1817588.5 dated Apr. 8, 2019.

U.S. Appl. No. 15/921,492, filed Dec. 27, 2019, Office Action.

Combined Search and Examination Report as received in UK Application GB2005865.7 dated Jan. 11, 2021.

Kirillov, Alexander & Girshick, Ross & He, Kaiming & Dollar, Piotr. (2019). Panoptic Feature Pyramid Networks. 6392-6401. 10.1109/CVPR.2019.00656.

Carion, Nicolas et al. "End-to-End Object Detection with Transformers," arXiv preprint arXiv:2005.12872 (2020).

U-net architecture and use techniques and approaches found in Olaf Ronneberger et al., "U-Net: Convolutional Networks for Biomedical Image Segmentation," submitted on May 18, 2015, arXiv:1505.049597.

Wang et al. in Joint Object and Part Segmentation using Deep Learned Potentials, In Proc. International Conference on Computer Vision (ICCV), 2015.

J. Dong et al.; Towards Unified Human Parsing And Pose Estimation, In CVPR, pp. 843-850, 2014.

U.S. Appl. No. 16/518,880, filed Dec. 23, 2020, Office Action.

U.S. Appl. No. 16/518,810, filed Jan. 8, 2021, Preinterview 1st Office Action.

Examination Report as received in Australian application 2020202602 dated Oct. 18, 2021.

Intention to Grant as received in Australian application 2018250370 dated Oct. 21, 2021.

U.S. Appl. No. 16/518,810, filed Oct. 27, 2021, Office Action.

Examination Report as received in Australian application 2020201988 dated Oct. 29, 2021.

U.S. Appl. No. 16/518,850, filed Nov. 4, 2021, Office Action.

Examination Report as received in United Kingdom application GB2005865.7 dated Sep. 14, 2021.

(56) References Cited

OTHER PUBLICATIONS

Examination Report as received in Australian application 2018250370 dated Jun. 10, 2021.
Examination Report as received in Australian application 2020202658 dated Aug. 23, 2021.
Examination Report as received in Australian application 2020202602 dated Sep. 14, 2021.
Intention to Grant as received in United Kingdom Application GB2005704.8 dated Sep. 30, 2021.
U.S. Appl. No. 16/518,880, filed Apr. 7, 2021, Notice of Allowance.
U.S. Appl. No. 16/518,810, filed Apr. 16, 2021, 1st Action Office Action.
U.S. Appl. No. 16/518,810, filed Jul. 15, 2021, Office Action.
U.S. Appl. No. 16/817,418, filed Mar. 22, 2021, Notice of Allowance.
U.S. Appl. No. 16/518,850, filed Apr. 6, 2021, Preinterview 1st Office Action.
U.S. Appl. No. 16/518,850, filed May 28, 2021, 1st Action Office Action.
U.S. Appl. No. 16/518,850, filed Jun. 18, 2021, Office Action.
Examination Report as received in Australian application 2020202602 dated Nov. 22, 2021.
Notice of Grant as received in Australian Application 2020202658 dated Dec. 23, 2021.
Notice of Grant as received in United Kingdom application GB2005704.8 dated Nov. 16, 2021.
Examination Report as received in Australian application 2020202601 dated Nov. 5, 2021.
Examination Report as received in United Kingdom application GB2005865.7 dated Dec. 14, 2021.
U.S. Appl. No. 16/518,850, filed Jan. 25, 2022, Office Action.
U.S. Appl. No. 16/919,383, filed Feb. 10, 2022, Notice of Allowance.
U.S. Appl. No. 16/800,415, filed Feb. 17, 2022, Preinterview 1st Office Action.

\* cited by examiner

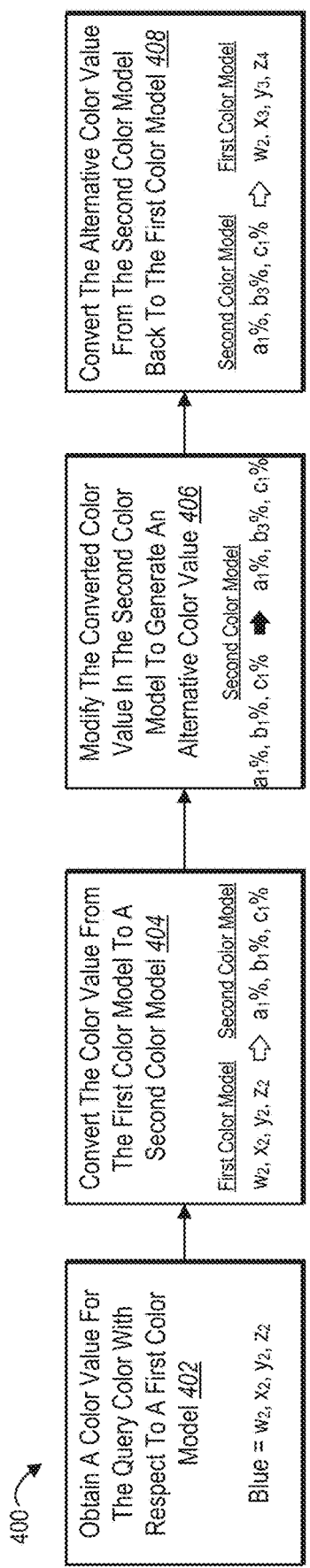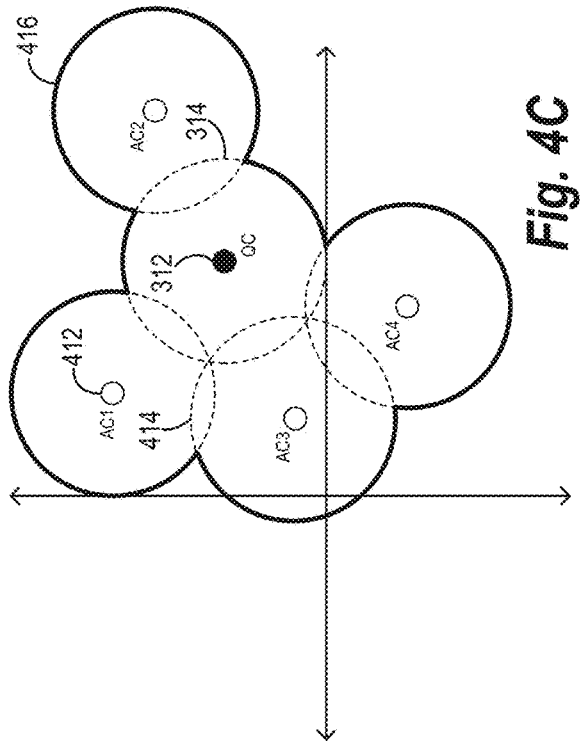
Fig. 4A
Fig. 4B
Fig. 4C

Pixel Validity Table 510

| Pixel 512 | Valid 514 | Invalid 516 |
|---|---|---|
| A1 | X | |
| A2 | X | |
| A3 | | X |
| A4 | X | |
| ... | ... | ... |
| D4 | X | |
| Total Valid Pixels: 75% | | |

*Fig. 5C*

Pixel Color Matching Table 520

| Pixel 522 | Shortest Distance 524 | Average Distance 526 | Query Color Distance 528 |
|---|---|---|---|
| A1 | 4 | 12 | 5 |
| A2 | 5 | 10 | 5 |
| A3 | 4 | 8 | 7 |
| A4 | 6 | 12 | 6 |
| ... | ... | ... | ... |
| D4 | 3 | 7 | 9 |

*Fig. 5D*

CLASSIFYING COLORS OF OBJECTS IN DIGITAL IMAGES

BACKGROUND

Recent years have seen a rapid proliferation in the use of digital images. Indeed, advances in both hardware and software have increased the ability of individuals to capture, create, edit, search, and share digital images. For instance, the hardware on most modern computing devices (e.g., servers, desktops, laptops, tablets, and smartphones) enables digital image editing and sharing without significant processing delays. Similarly, improvements in software enable individuals to modify, search, share, or otherwise utilize digital images.

With the increased use of digital images has come an increased need for systems that can quickly and efficiently classify and detect digital images, and in particular, identify objects in images based on their color. However, conventional image selection systems suffer from a number of problems in relation to accuracy, efficiency, and flexibility of operation.

As an example of inaccuracies, many conventional systems fail to accurately classify objects in images associated with a given color. In particular, conventional systems employ simplistic color classification schemes that fail to capture the complexity and nuances of color matching associated with the human perception of color. To further compound this issue, when an object in an image is visually influenced due to poor capturing conditions (e.g., lighting, angles, exposure, or sharpness) or other image variations, conventional systems will often fail to identify the object in the image as having a given color.

In some embodiments, conventional systems inaccurately misclassify objects as a given color when the objects are, in fact, not the given color. Again, due to the inability to accurately account for variations on image quality and conditions, conventional systems produce false positive results. Consequently, individuals are left to manually cull images that are improperly identified or classified.

Moreover, conventional systems are inefficient. For instance, conventional systems require a large amount of processing resources to classify and detect objects of a given color within images. The amount of computer resources and memory needed to classify and detect objects in images significantly increases as images continue to increase in size. Further, when conventional systems misclassify and/or misidentify objects, as described above, individuals must correct these errors, which requires significant time and user interaction. Additionally, conventional systems waste significant computing resources in misclassifying and misidentifying objects in images.

Furthermore, conventional systems have significant shortfalls in relation to flexibility of operation. For example, conventional systems cannot handle differences in color attributes when detecting objects associated with specified colors. Further, the rigidity of conventional systems prevents these systems from operating in a way that flexibly captures human perception with respect to color matching.

These, along with additional problems and issues exist in image selection systems with respect to classifying and detecting objects and object colors in digital images.

BRIEF SUMMARY

Embodiments of the present disclosure provide benefits and/or solve one or more of the foregoing or other problems in the art with systems, non-transitory computer-readable media, and methods for classifying objects based on colors in digital images. For instance, the disclosed systems can utilize an improved color classifier model that accurately and efficiently classifies the color of objects in images.

To illustrate, the disclosed systems can identify a color similarity region for a color (e.g., a target color) within a multidimensional color space or separate color similarity regions for multiple colors. In addition, the disclosed systems can identify an object in a digital image. For pixels representing the object, the disclosed systems can map the pixels to the multidimensional color space to determine a color correspondence to the color similarity region (or regions for the multiple colors). Additionally, the disclosed systems can generate a color-matching score for the object with respect to the color based on the color correspondences between the object pixels and the color similarity region. Further, the disclosed systems can classify the object as the color based on the color-matching score (e.g., satisfying a minimum color-matching threshold for the color).

While this summary refers to the disclosed systems for simplicity, the summary also applies to certain disclosed methods and non-transitory computer-readable media. The following description sets forth additional features and advantages of one or more embodiments of the disclosed systems, computer media, and methods. In some cases, such features and advantages will be evident to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

FIGS. 4A-4C illustrate generating and mapping alternative query colors to the color space in an image in accordance with one or more embodiments.

FIGS. 5A-5E illustrate generating a color-matching score for a query object in accordance with one or more embodiments.

DETAILED DESCRIPTION

Figure 1:
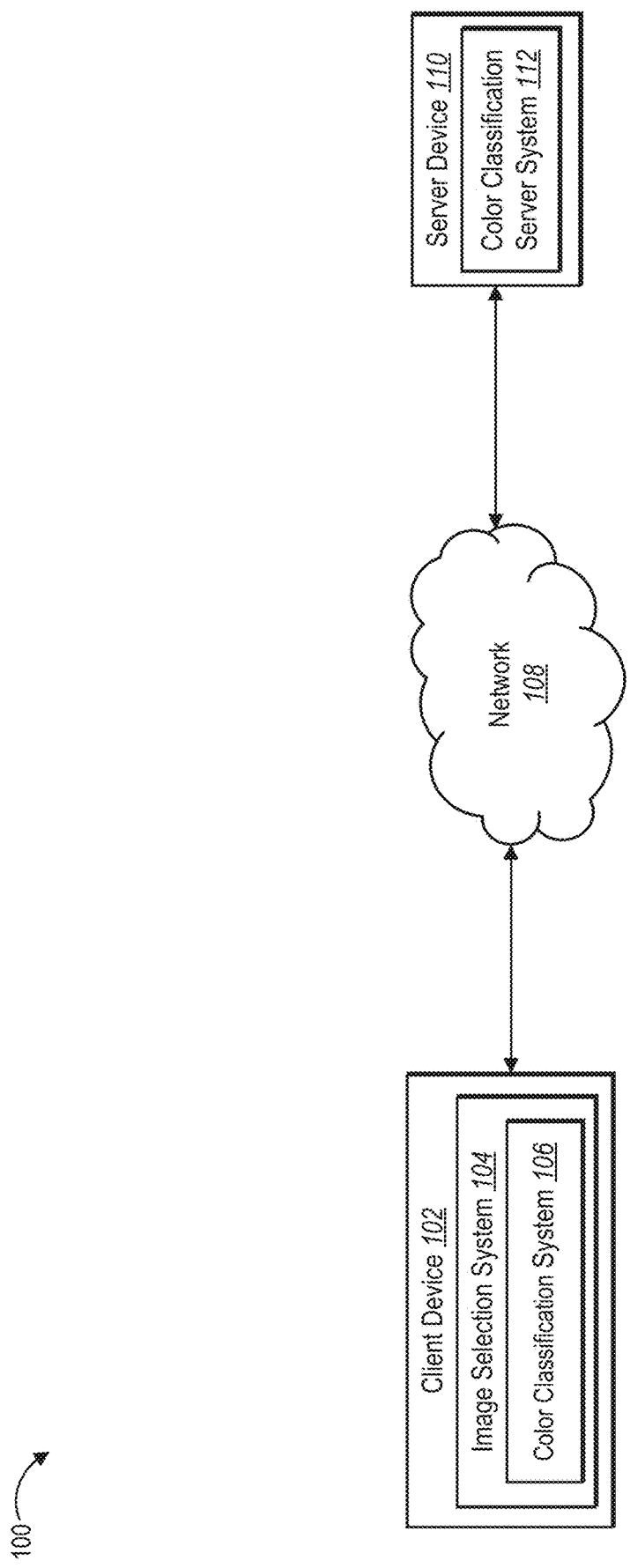
FIG. 1 illustrates a schematic diagram of an environment in which a color classification system can operate in accordance with one or more embodiments.

This disclosure describes one or more embodiments of a color classification system that accurately classifies object colors in digital images. In particular, in one or more embodiments, the color classification system utilizes a multidimensional color space and one or more color mappings to classify the color of objects. Using the color classifier, the color classification system can accurately and efficiently detect a particular instance of an object in an image based on a target color as well as identify one or more digital images that include the objects matching the target color.

To illustrate, in one or more embodiments, the color classification system can identify a color similarity region for a color within a multidimensional color space or separate color similarity regions for multiple colors. In addition, the color classification system can identify an object in a digital image that is made of up of pixels. The color classification system can map the pixels to the multidimensional color space to determine a color correspondences with the one or more color similarity regions. Additionally, the color classification system can generate one or more color-matching scores for the object with respect to the one or more colors based on the color correspondences. Further, the color classification system can classify the object as a color based on the color-matching scores.

As mentioned above, the color classification system can utilize color similarity regions to map pixels of an object to a color. In various embodiments, the color classification system can generate a color similarity region for a color by mapping the color to the multidimensional color space as well as mapping alternative/similar colors to the color to the same multidimensional color space. For example, in one or more embodiments, for a target color, the color classification system can map alternative colors to the color space near the target color. In some embodiments, the color classification system modifies attributes of the target color in the color classification system to generate alternative colors, as described below.

As mentioned above, the color classification system can generate an alternative color utilizing multiple color spaces (corresponding to color models). For example, the color classification system can map a given color (e.g., target color) from a first color model to a second color model, where the color models are defined by different color attributes and/or parameters. Further, in some embodiments, the color classification system can modify one or more attributes of the given color in the second color model to generate an alternative color in the second color model. The color classification system can then convert the alternative color back to the first color model and map it to the multidimensional color space near the given color.

The color classification system can maintain color similarity regions for a set of colors. For example, the color classification system selects a list of colors and generates one or more color similarity regions for each of the colors.

Then, when classifying an object in an image as a color, the color classification system maps pixels of the object to the multidimensional color space and determines color correlations between the mapped object pixels and each of the pre-mapped color similarity regions. The color classification system can classify the object as the color whose color similarity region includes the most favorable color correlation (e.g., the most mapped object pixels). In this manner, the color classification system can classify objects to common colors and/or colors for which the color classification system has previously generated color similarity regions in the multidimensional color space.

In some embodiments, the color classification system can generate a color similarity region for a target color in connection with performing object detection. To illustrate, in one or more embodiments, the color classification system can identify a search query that includes a query color (i.e., target color) and a corresponding query object. In response to the query, the color classification system can map the query color to a first point in multidimensional color space as well as generate and map alternative query colors to the same color space to form the color similarity region for a query color. Further, the color classification system can detect the query object in a digital image. Moreover, the color classification system can generate a color-matching score for the query object based on comparing the pixels corresponding to the query object to the mapped points corresponding to the query color in the color space. Further, the color classification system can provide the digital image to a user based on the query object satisfying a color-matching threshold.

As mentioned above, the color classification system can classify and detect a query object of a query color in a digital image (or simply "image") in response to a query. For example, the query can correspond to a search query to identify images that include the query object in the query color. In another example, the query can correspond to a selection query to automatically select one or more instances of the query object in an image with the corresponding query color from a plurality of instances of the query object in the image.

As mentioned above, the color classification system can detect a query object in an image. For example, in one or more embodiments, the color classification system can utilize an object detection neural network to detect the query object (of any color) in an image. In some cases, the object detection neural network detects multiple instances of the query object in an image. In various embodiments, the object detection neural network detects the query object in multiple images. Depending on how the object detection neural network is trained, the object detection neural network can detect objects from a variety of object classes and types.

As mentioned above, in various embodiments, the color classification system can generate a color-matching score for the detected query object. For example, in a number of embodiments, the color classification system can compare the pixels of an object to one or more colors. For instance, the color classification system can map each pixel to the multidimensional color space to determine whether the pixel is near the given color or alternative colors of the given color (e.g., within the color's color similarity region). The color classification system can then calculate a color-matching score for the object based on the number or percentage of pixels within the color similarity region (i.e., valid pixels) and pixels outside of the color similarity region (i.e., invalid pixels).

In various embodiments, the color classification system can downsize (i.e., downscale) the pixels of an object. For example, the color classification system can reduce the number of pixels of the query object utilizing one or more approaches described below. By reducing the number of pixels analyzed, mapped, and compared in the multidimensional color space, the color classification system can reduce processing and memory requirements.

In some embodiments, the color classification system can apply filtering thresholds to the color-matching scores of one or more objects. For example, the color classification system can filter out objects with a color-matching score below a threshold amount. Further, in embodiments where multiple objects are detected (or multiple object instances), the color classification system can further filter out a detected object having a color-matching score that is notably lower than color-matching scores of other detected objects.

As previously mentioned, the color classification system provides numerous advantages benefits, and practical applications over conventional systems. In particular, the color classification system provides improvements in accuracy, efficiency, and flexibility of operation. To elaborate, as mentioned above, the color classification system can classify an object's color based on mapping the color and one or more alternative colors to a multidimensional color space to form a color similarity region. In many embodiments, the color similarity region closely mimics human color perception and behavior in terms of color matching accuracy. In this manner, the color classification system significantly improves color matching accuracy over conventional systems.

Additionally, the color classification system accounts for image variations and poor capturing conditions by representing colors with the multidimensional color space as similarity regions. Indeed, by generating and utilizing the similarity regions, the color classification system can match objects to their color where conventional systems otherwise would fail to find the same color match. Further, as a result of providing improved accuracy, the color classification system better classifies and detects objects in images that match a target color. Moreover, the added accuracy reduces the number of misclassifications and false positives.

Furthermore, the color classification system provides improved efficiency over conventional systems. As mentioned above, in various embodiments, the color classification system can downsample pixels on an object before generating a color-matching score for the object. By reducing the number of pixels in each object and/or each object instance, the color classification system reduces the processing and memory resources needed to match colors.

Further, as mentioned above, the improved accuracy of the color classification system results in improved efficiency. Indeed, increased accuracy results in fewer overall computer computations through fewer object searches, object detections, pixel color comparisons, object color score calculations, and computations in response to user interactions. In some embodiments, the color classification system further improves efficiency by stopping color-matching score calculations when a minimum number/percentage of pixels in an object satisfy a minimum color-matching threshold.

Moreover, the color classification system provides increased flexibility over conventional systems. As mentioned above, in various embodiments, the color classification system can utilize multiple color models rather than a single color model. For example, the color classification system can select a second color model to modify a color attribute that is more granular in the second color space (corresponding to the second color model) than in the first color space. Indeed, in some cases, the color classification system would not be able to precisely modify a specific color attribute of a color in the first color space alone. Thus, thought the use of multiple color models, the color classification system provides increased flexibility.

Additional advantages and benefits of the color classification system will become apparent in view of the following description. Further, as illustrated by the foregoing discussion, the present disclosure utilizes a variety of terms to describe features and advantages of the color classification system. Before describing the color classification system with reference to figures below, additional detail is now provided regarding the meaning of such terms.

As used herein, the term "digital image" (or simply "image") refers to a digital graphics file that when rendered displays one or more objects. In particular, an image can include one or more objects associated with any suitable object type or object class. In various embodiments, an image selection system displays an image on a computing device, such as a client device. In additional embodiments, the image selection system enables a user to modify or change an image, generate new images, and search for images.

The term "object," as used herein, refers to a visual representation of a subject in an image. In particular, an object refers to a set of pixels in an image that combines to form a visual depiction of an item, article, or element. An object can correspond to a wide range of classes and concepts. In some embodiments, an image includes multiple instances (e.g., occurrences) of an object. For example, an image of a bouquet of roses includes multiple instances of roses.

In various embodiments, the term "query object," as used herein corresponds to an object identified in a query (e.g., a request for an object search or selection request). In particular, a query object can refer to an object in a query that is being requested for detection and/or selection. In some instances, the noun in a query often indicates the query object while an adjective indicates attributes of the query object (e.g., object attributes), such as an object color. As used herein, the term "query color" refers to a color identified in a query corresponding to a query object. Indeed, the query color refers to the color of the query object (or at least a portion thereof) to be detected or selected in an image.

As used herein, the term "color" refers to the property of light reflecting at a particular wavelength. In addition to hue, color can include attributes such as brightness, contrast, saturation, tone, shade, tinge, tint, pigment, chroma, luminosity, chromaticity, undertone, iridescence, intensity, polychromasia, and/or colorimetric quality. In a number of embodiments, each pixel in an image is shown as one color. In addition, the color of a pixel is represented by a color value associated with a color model. Color models are associated with different multidimensional color spaces (e.g., 3 or more dimensions) that correspond to the values and attributes defined by the corresponding color model.

An example of a color model is the Red, Green, and Blue ("RGB") color model, which forms a color value defines using a set of components 256×256×256 in hex code. Another color model is the CIELAB (or simply "LAB") that expresses three components for a color—L* for the lightness from black (0) to white (100), a* from green (−) to red (+), and b* from blue (−) to yellow (+). Still, other color models include the HSL (hue, saturation, lightness) model, HSV (hue, saturation, value) model, and CMYK (cyan, magenta, yellow, key). As u The term, "alternative color" (or "alternative query color") refers to a derivative or alternative version of a color. For instance, an alternative color is a copy of a given color with one or more color values or attributes changed. The color classification system can generate one or more alternative colors for a given color. For example, an alternative color can comprise a color with the brightness, saturation, or lightness (or another attribute) modified. As described below, the color classification system can utilize multiple color models to generate alternative colors. For example, the color classification system can map a color from a first color space to a second color space, modify an attribute of the color in the second color shape, and map the modified color back to the first color space to generate the alternative color.

As used herein, the term "color similarity region" refers to an area of a multidimensional color space associated with a reference color (or simply "color") and one or more alternative colors. For example, a color similarity region can comprise a region defined by a color point for a reference color and one or more additional color points for alternative colors corresponding to the reference color. A color similarity region can capture the reference color and visually similar colors.

As used herein, the term "color-matching score" refers to a level of correspondence between a first color and at least a second color. In some embodiments, a color-matching score is the level or amount (e.g., number or percent) of correspondence between a first color (e.g., a target color) and multiple versions of the second color (e.g., "alternative query colors"). As described below, the color-matching score can be based on a number or percentage of valid pixels within an object. In some embodiments, the color-matching score can be based on pixel color matching strengths.

The term "color-matching threshold" refers to a condition or value where a pixel is considered a match to a color (e.g., a target color). For instance, the color-matching threshold indicates when the color value for a pixel is similar enough to a color in multidimensional color space to match the color. The minimum color-matching threshold refers to the lowest color value a pixel can have with a color to be considered a match.

As mentioned above, the color classification system can employ machine learning and various neural networks in various embodiments. The term "machine learning," as used herein, refers to the process of constructing and implementing algorithms that can learn from and make predictions on data. In general, machine learning may operate by building models from example inputs, such as image exposure training pairs within a training dataset of images, to make data-driven predictions or decisions. Machine learning can include neural networks (e.g., an object detection neural network, an object mask neural network, and/or an object classification neural network), data-based models, or a combination of networks and models.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), Region-CNN (R-CNN), Faster R-CNN, Mask R-CNN, and single shot detect (SSD).

Referring now to the figures, FIG. 1 illustrates a schematic diagram of an environment 100 in which the color classification system 106 can operate in accordance with one or more embodiments. As shown in FIG. 1, the environment 100 includes a client device 102 and a server device 110 connected via a network 108. Additional detail regarding computing devices (e.g., the client device 102 and the server device 110) is provided below in connection with FIG. 13. In addition, FIG. 13 also provides additional detail regarding networks, such as the illustrated network 108.

Although FIG. 1 illustrates a particular number, type, and arrangement of components within the environment 100, various additional environment configurations are possible. For example, the environment 100 can include any number of client devices. As another example, the server device 110 can represent a set of connected server devices. As a further example, the client device 102 may communicate directly with the server device 110, bypassing the network 108 or utilizing a separate and/or additional network.

As shown, the environment 100 includes the client device 102. In various embodiments, the client device 102 is associated with a user (e.g., a user client device), such as the user that requests automatic selection of an object in an image of a specific color (e.g., a selection request) and/or requests detecting of images that include an object of a target color (e.g., a search request). The client device 102 can include an image selection system 104 and a color classification system 106. In various embodiments, the image selection system 104 implements the color classification system 106. In alternative embodiments, the color classification system 106 is separate from the image selection system 104. While the image selection system 104 and the color classification system 106 is shown on the client device 102, in some embodiments, the image selection system 104 and the color classification system 106 are located remotely from the client device 102 (e.g., on the server device 110), as further explained below.

The image selection system 104, in general, facilitates search, creation, modification, and/or deletion of digital images within applications. Further, the image selection system 104 can facilitate maintaining, searching for, identifying, and/or sharing digital images. In one or more embodiments, the image selection system 104 provides a variety of tools related to image creation and editing (e.g., photo-editing). For example, the image selection system 104 provides selection tools, color correction tools, and image manipulation tools. In some embodiments, the image selection system 104 provides tools related to object detection in images and across image sets. In various embodiments, the image selection system 104 can operate in connection with one or more applications to generate or modify images. For example, in one or more embodiments, the image selection system 104 operates in connection with digital applications such as ADOBE PHOTOSHOP, ADOBE ELEMENTS, ADOBE INDESIGN, ADOBE ACROBAT, ADOBE ILLUSTRATOR, ADOBE STOCK, ADOBE AFTER EFFECTS, ADOBE PREMIERE PRO, CREATIVE CLOUD software, BEHANCE, or other image editing and search applications.

In some embodiments, the image selection system 104 provides an intelligent image editing assistant that performs one or more automatic image editing operations for the user. For example, given an image of a pack of wolves, a user requests that the image selection system "remove the white wolf." As part of fulfilling the request, the image selection system 104 utilizes the color classification system 106 to automatically detect the white wolf. The image selection system 104 can then utilize additional system components (e.g., an object mask network and/or a hole filling neural network) to select, remove, replace the selected white wolf. In some embodiments, the color classification system 106 automatically removes the object in response to the user request.

In various embodiments, the image selection system 104 provides an intelligent image search interface that identifies requested objects of a specified color. For example, a user or system (e.g., a computer image search system) provides a query to identify images that include red cups. To fulfill the query request, the image selection system 104 utilizes the color classification system 106 to automatically detect images within one or more databases of images that include red cups.

As mentioned above, the image selection system 104 includes the color classification system 106. As described in detail below, the color classification system 106 accurately classifies objects by color. In various embodiments, the color classification system 106 identifies the color of an object in an image. In one or more embodiments, the color classification system 106 matches one or more objects in an image to a query color based on a user's request (e.g., a user-provided query string). In some embodiments, the color classification system 106 can be included as part of a dynamic system that determines which object detection neural network to utilized based on the query object as well as which additional neural networks and/or models (e.g., the color classification system 106) to utilize to select a query object having a particular attribute (e.g., query color).

As shown, the environment 100 also includes the server device 110. The server device 110 includes a color classifier server system 112. For example, in one or more embodiments, the color classifier server system 112 represents and/or provides similar functionality as described herein in connection with the color classification system 106. In some embodiments, the color classifier server system 112 supports operation of the color classification system 106 on the client device 102.

Moreover, in one or more embodiments, the server device 110 can include all, or a portion of, the color classification system 106. In particular, the color classification system 106 on the client device 102 can download an application from the server device 110 (e.g., an image editing application and/or a search interface from the color classifier server system 112) or a portion of a software application (e.g., an image search function within an image editing application).

In some embodiments, the color classifier server system 112 can include a web hosting application that allows the client device 102 to interact with content and services hosted on the server device 110. To illustrate, in one or more embodiments, the client device 102 accesses a web page supported by the server device 110 that automatically detects object colors in images based on user input from the client device 102. As another example, the client device 102 provides an image editing application that provides the image and a selection query to the color classifier server system 112 on the server device 110 that includes a query object and a query color, which then detects the query object in the query color and provides an object mask of the detected query object back to the client device 102. Then, utilizing the object mask, the image editing application on the client device 102 selects the detected query object.

Figure 2:
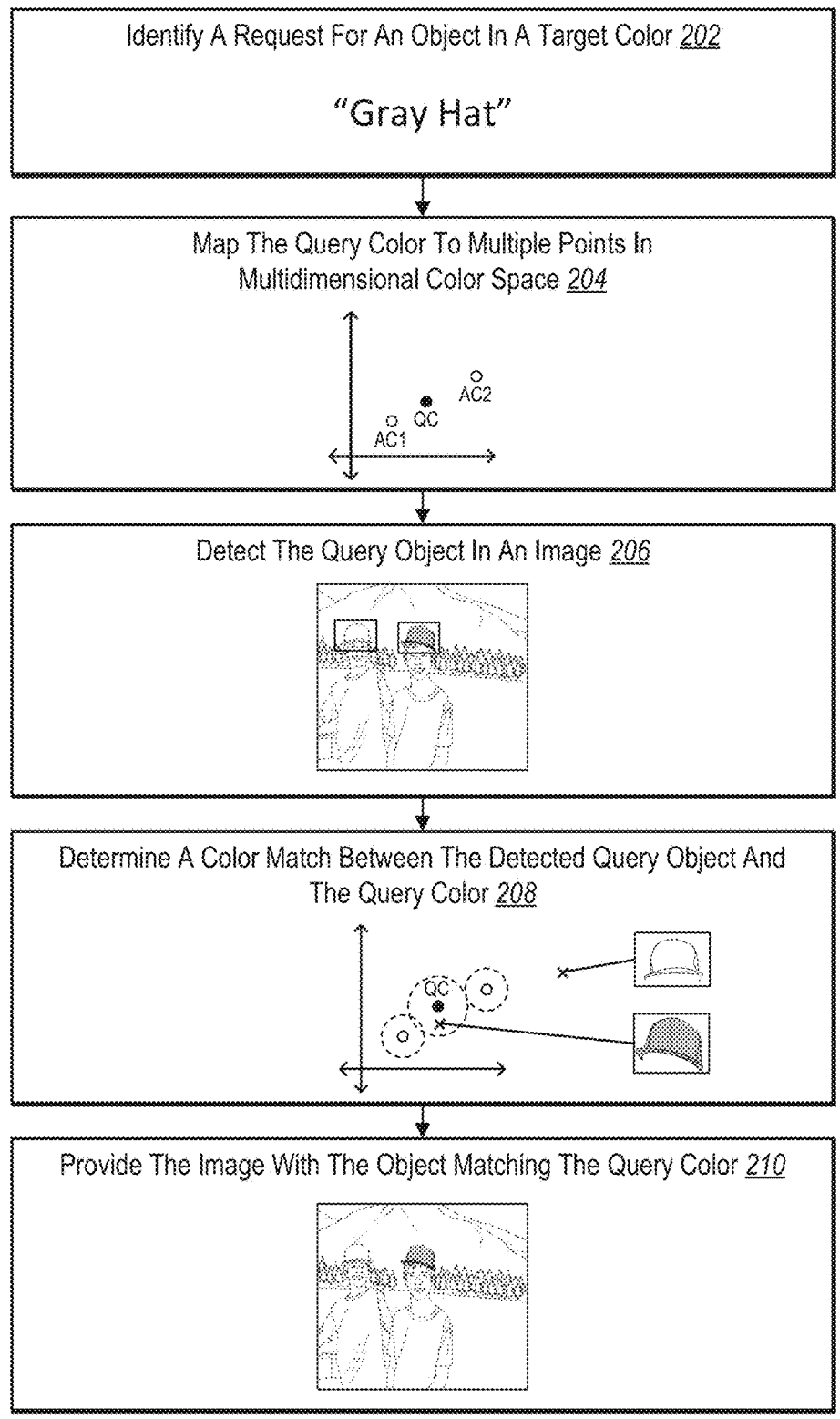
FIG. 2 illustrates a flow diagram of classifying a query object within a digital image as a target color in accordance with one or more embodiments.

As mentioned above, FIG. 1 shows an example environment 100 in which the color classification system 106 can operate. Turning to the next figure, FIG. 2 provides an overview of utilizing the color classification system to automatically detect colored objects in images. In particular, FIG. 2 illustrates a series of acts 200 of classifying a query object within a digital image as a target color (e.g., query color) within a digital image in accordance with one or more embodiments. In various embodiments, the color classification system 106 performs the series of acts 200. In additional embodiments, additional systems, such as the image selection system 104, an object detection neural network, and/or an object mask system perform steps in the series of act 200.

As shown in FIG. 2, the series of acts 200 includes the act 202 of the color classification system 106 identifying a request for an object in a target color. As shown in FIG. 2 in connection with the act 202, the user provides the query string of "gray hat." For example, the user is requesting, via an image search system, that the color classification system 106 identify an image that includes a gray hat. In another example, the user is requesting, via an image editing program, automatic selection of a gray hat within an image the user is editing.

In various embodiments, the color classification system 106 can provide a graphical user interface that enables the user to enter a search or selection query. For example, the graphical user interface enables the user to enter text input (e.g., a query string) indicating a query object and a query color. In some embodiments, the graphical user interface provides a color selection menu (e.g., a drop-down menu, color wheel, color gradient, color palette, or other color selection interface) from which a user can select a color from a set of colors.

In response to receiving a query request, the color classification system 106 can perform the act 204 of mapping the query color to multiple points in multidimensional color space. For example, the color classification system 106 converts the query color to a color value defined by a color model and plots the query color in multidimensional color space. In general, the multidimensional color space includes at least three dimensions, but could include any number of dimensions, where each dimension can correspond to an attribute or characteristic of a given color.

In addition, as part of performing the act 204, the color classification system 106 can identify alternative query colors. For example, the color classification system 106 generates and/or identifies variations of the query color and maps those colors to the multidimensional color space. In this manner, the color classification system 106 generates a color similarity region in the multidimensional color space for the query color. As shown in connection with the act 204, FIG. 2 illustrates a simplistic mapping of the query color (i.e., QC) and alternative query colors (i.e., AC1 and AC2) in a color space.

As described below, in some embodiments, the color classification system 106 utilizes a second color model to generate one or more alternative query colors. For instance, the color classification system 106 converts the query color to a second color value defined by a second color model, modifies one or more attributes of the query color based on the second color model, then converts the modified query color back to the first color model to generate an alternative query color. Further, the color classification system 106 can map each of the alternative query colors to the multidimensional color space of the first color model. Additional detail regarding mapping the query color to multiple points in multidimensional color space is provided below in connection with FIG. 3A-4C.

In alternative embodiments, the color classification system 106 can access a previously generated color similarity region for the query color. For example, the color classification system 106 previously performed the act 204 of mapping the query color to multiple points in multidimensional color space. Further, in some embodiments, the color classification system 106 has generated color similarity regions for multiple colors (e.g., the most popular or frequently requested colors).

The series of acts 200 can include the act 206 of the color classification system 106 detecting the query object in an image. In various embodiments, the color classification system 106 utilizes one or more object detection neural networks or other models to detect the query object within an image. In one or more embodiments, one or more other systems perform the act 206, such as an object selection system, an object detection system, and/or an object mask system that is part of the image selection system or a remote or third-party system. In some embodiments, the color classification system 106 identifies one or more target areas in an image (e.g., pixels in the image associated with a detected object). Additional detail regarding detecting the query object from the query in an image is provided below in connection with FIGS. 9A-9D.

As illustrated in connection with the act 206, FIG. 2 shows an image of two boys wearing hats where both hats are detected. For example, the color classification system 106 determines from the query that the query object was "hat." Based on the query object, the color classification system 106 identified two instances of a hat in the image. Indeed, when multiple instances of the query object are included in an image, the color classification system 106 can detect each of the multiple instances.

As shown, the series of acts 200 can include the act 208 of the color classification system 106 determining a color match between the detected query object and the query color. For example, in some embodiments, the color classification system 106 can compare the query color to colors (e.g., pixels) of the detected query object to determine whether the detected query object matches the query color. As described below in detail, the color classification system 106 can plot the color of a detected query object to the multidimensional color space to determine whether the color of the detected query object falls within the color similarity region associated with the query color.

As illustrated in connection with the act 208, FIG. 2 shows a simple depiction of the color space. When the color classification system 106 applies a color similarity threshold to each mapped point (e.g., shown as the circle around each point) the query color and alternative query colors form a color similarity region within the color space. As mentioned above, this color similarity region within the color space better aligns with human perception of color than a simple single color similarity threshold around only the query color. Additional detail regarding determining a color match between the detected query object and the query color is provided below in connection with FIG. 5A-5E.

Further, in FIG. 2, the act 208 shows where the gray hat and the white hat appear in the multidimensional color space. As shown, the gray hat is within the color similarity thresholds of the query color and the alternative query colors indicating a color match to the query color. Further, the white hat is outside of the color similarity thresholds of the query color and the alternative query colors indicating no color match with the query color.

In some embodiments, the color classification system 106 performs the act 206 based on comparing the pixels of the query object to multiple previously generated color similarity regions (or multiple color similarity regions generated along with generating the color similarity region for the query color). In some embodiments, the color classification system 106 can determine the color match between the detected query object and the query color based on the pixels of the query object have the highest correspondence with the color similarity region of the query color than with color similarity regions of other colors. For example, more pixels of the query object where located within the color similarity region of the query color than in the color similarity regions corresponding to other colors. In another example, the pixels of the query object had shorter distances in the multidimensional color space with the query color and/or alternative query colors than with other colors and/or corresponding alternative colors.

As shown, the series of act 200 can include the act 210 of the color classification system 106 providing the image with the object matching the query color. In some embodiments, the color classification system 106 can provide the image, such as in response to an image search query. In alternative embodiments, the color classification system 106 can provide the image with the query object matching the query color selected for the user, such as within an image editing application. In one or more embodiments, the color classification system 106 selects (e.g., provides an object mask of the grey hat).

As a note, the color classification system 106 can perform some of the acts 202-210 in the series of acts 200 in a variety of orders. For example, the color classification system 106 can detect the query object (e.g., the act 206) before, during, or after mapping the query color and alternative query colors to the multidimensional color space (e.g., act 204). Further, the series of acts 200 can include additional acts, such as generating object masks for each of the detected query objects.

Figures 3A, 3B:
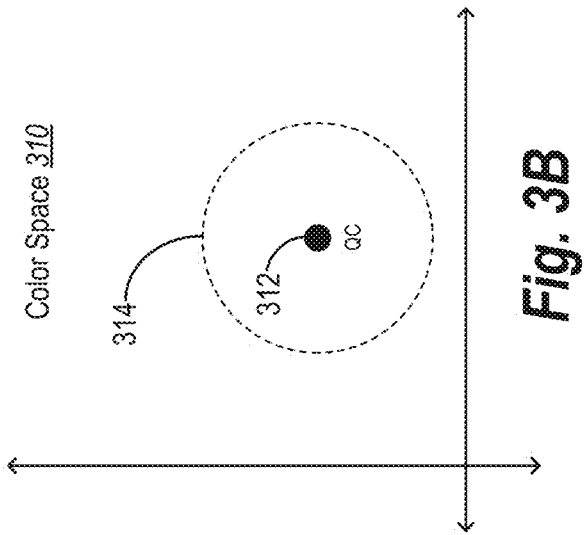
FIGS. 3A-3B illustrate mapping a query color to a color space in accordance with one or more embodiments.

As mentioned above, the color classification system 106 can map a color to a multidimensional color space. In addition, the color classification system 106 can generate and map alternative colors to the multidimensional color space in connection with the color. FIGS. 3A-4C illustrate mapping the color and alternative colors to the multidimensional color space along with corresponding actions performed by the color classification system 106. In particular, FIGS. 3A-3B illustrate the color classification system 106 mapping a color to a color space in an image in accordance with one or more embodiments. FIGS. 4A-4C illustrate the color classification system 106 generating and mapping alternative colors to the color space in accordance with one or more embodiments.

For ease of explanation, FIGS. 3A-FIG. 10 describe embodiments of the invention in terms of a query color and query object. However, in many of the embodiments described below, the color classification system 106 can pre-generate, store, and utilize one or more color similarity regions corresponding to multiple colors (e.g., multiple query colors or a set of common colors) in addition to a query color. Further, the color classification system 106 can generate multiple color similarity regions for multiple colors in connection with (e.g., at or near the same time as) generating a color similarity region for the query color.

Turning now to FIGS. 3A-3B, FIG. 3A illustrates a color mapping table 302. To provide context, in various embodiments, the color classification system 106 can convert a query color to a color value. In various embodiments, the color classification system 106 can convert the query color into a color value utilizing the color mapping table 302. As shown, the color mapping table 302 includes a first column of known colors organized by color name 304 and a second column of color values 306 corresponding to the color names 304 (e.g., the colors). In general, the color mapping table 302 corresponds to a first color model (e.g., the LAB color model or another color model) that specifies the color components that make up a color value 306. Indeed, the color values 306 can include mathematical values of components for each color included in the color model (e.g., a LAB color value).

Upon identifying a query color, the color classification system 106 can convert the query color to a color value within the color model. For example, if the color classification system 106 identifies the query color of "blue," the color classification system 106 can utilize the color mapping table 302 to find the color name 304 of "blue" and the corresponding color value 306 having the components "$w_2$, $x_2$, $y_2$, and $z_2$." In various embodiments, the color value 306 includes components shown as a number, a percentage, a range of values, and/or a set of axis coordinates.

Based on the color value 306, the color classification system 106 can map the query color to a multidimensional color space (or simply "color space"). To illustrate, FIG. 3B shows a simplified version of a color space (i.e., color space 310). While a simplified two-dimensional color space is illustrated for ease in explanation, the color space 310 can include additional dimensions. For example, the color space 310 can include three dimensions that indicate three different attributes and characteristics of a color within a color model. In some embodiments, the color space 310 is generated by a color embedding neural network (i.e., a machine-learning model) and includes a large number of dimensions corresponding to latent features a color.

As shown in FIG. 3B, the color classification system 106 can map the query color to the color space 310 (shown as the mapped query color 312). In various embodiments, the color classification system 106 utilizes the color value 306 (i.e., components) from the color mapping table 302 to identify axis coordinates within the color space 310. In alternative embodiments, the color classification system 106 converts the color value 306 from the color mapping table 302 to axis coordinates to generate the color mapping of the query color.

As also shown, the mapped query color 312 is surrounded by a color similarity threshold 314 (e.g., a distance threshold). The color similarity threshold 314 can indicate whether another color is similar or a match to the query color. For example, if another color maps to within the color similarity threshold 314 of the query color, then, the color classification system 106 can determine that the other color is a match.

In general, the color similarity threshold 314 is represented by a specified distance within the color space 310. Based on the number of dimensions in the color space 310, the color similarity threshold 314 can form into a variety of shapes. For example, if the color space 310 is three dimensions, the color similarity threshold 314 would form a sphere. Similarly, the color space 310 is n dimensions, then the color similarity threshold 314 would form an n-dimensional shape.

As mentioned above, upon identifying the query color, the color classification system 106 can also identify one or more alternative query colors to also map to the color space 310. To this end, FIG. 4A illustrates a series of acts 400 for generating an alternative query color. In various embodiments, the color classification system 106 can perform the series of acts 400.

As shown, the series of acts 400 can include the act 402 of the color classification system 106 obtaining a color value 306 (e.g., components) for the query color with respect to a first color model. In various embodiments, the color classification system 106 can utilize a color mapping table, as described above. For instance, if the query color is identified from a query string, the color classification system 106 can utilize the color mapping table 302 to identify a color value 306 for the query color. In alternative embodiments, the color classification system 106 can identify the color value 306 for the query color from metadata associated with the query color. For example, if the query color is selected from a discrete set of colors, the color classification system 106 identifies a color value 306 already associated with the query color.

In addition, the series of acts 400 can include the act 404 of the color classification system 106 converting the color value 306 from the first color model to a second color model. In one or more embodiments, the color classification system 106 can utilize a color conversion function to convert components of the color value 306 query color from the color model associated with the color space 310 to a second color model. For example, the color classification system 106 can convert the query color from a LAB color value to an HSL color value utilizing a LAB to HSL color conversion function.

In one or more embodiments, the color classification system 106 can convert a copy of the query color to the second color model. In other words, even though the color classification system 106 converts the query color to the second color model, the color classification system 106 retains a record of the color value of the query color. In this manner, the converted copy of the query color becomes an alternative query color that supplements the original query color.

As shown in FIG. 4A, the series of acts 400 can include the act 406 of the color classification system 106 modifying the converted color value in the second color model to generate an alternative color value. In various embodiments, the color classification system 106 can modify one or more attributes of the converted query color by changing a component of the color value utilizing the second color model. For example, if a component of the second color model corresponds to color brightness, the color classification system 106 can reduce or increase the component value of the converted query color without changing the other components, as shown in the act 406.

In various embodiments, the color classification system 106 can perform one or more of predetermined modifications. For example, continuing the above example, the color classification system 106 can reduce or increase the brightness component of the converted query color by a percentage (e.g., half or 20%). In alternative embodiments, the color classification system 106 reduces or increases the brightness component by a value (e.g., 10 points). In a number of embodiments, the color classification system 106 creates multiple copies of the converted query color and performs separate modifications to each copy (e.g., increase brightness by 50% on one copy and decrease the brightness by 50% on a second copy) to create a set of alternative query values.

In some embodiments, the modifications are based on the color and/or color values. For example, the color classification system 106 can determine that a first color has a larger tolerance for modification than a second color with respect to a component of the second color model. In various embodiments, the color classification system 106 enables a user to specify a color-matching tolerance that influences the amount of the modifications (e.g., provides a scaling weight) that the color classification system 106 applies to a component of the converted query color in the second model. In one or more embodiments, the color classification system 106 utilizes machine-learning to learn optimal amounts to adjust a component in the second model based on training and feedback.

In various embodiments, the color classification system 106 can choose which secondary color model to utilize based on which color attributes of the query color the color classification system 106 desires to modify. Indeed, some color models have specific components for one color attribute that another color model lacks. Often, color models that focus on a target color attribute can perform higher granularity modifications to that color attribute than another color model. For instance, one color model can more precisely tweak the saturation of colors while another color model can better change the luminosity.

As shown in FIG. 4A, the series of acts 400 can include the act 408 of the color classification system 106 converting the alternative color value from the second color model back to the first color model. In various embodiments, the color classification system 106 can utilize the same or another color conversion function to map components of the alternative color value of the second color model to the first color model (e.g., the color model associated with the color space 310) to generate the alternative query color. For example, the color classification system 106 can convert the alternative color value from the HSL color model back to the LAB color model. As mentioned above, in some embodiments, the color classification system 106 can convert a set of alternative color values created in the second model to generate a set of alternative query colors corresponding to the first color model and the first color space.

As mentioned above, the color classification system 106 can utilize one secondary color model to adjust one color attribute of the query color and another secondary color model to adjust another color attribute of the query color. In some embodiments, the color classification system 106 utilizes multiple secondary color models to modify multiple color attributes of a query color. For example, the color classification system 106 converts the query color to a second color model and modifies a first color attribute before converting it back to the first color model to generate an alternative query color. Then, the color classification system 106 converts the alternative query color (or a copy) to a third color model, modifies a second color attribute, and converts it back to the first color model (e.g., replacing or adding to the alternative query color). Still, in some embodiments, the color classification system 106 modifies one or more color attributes of the query color using the color model associated with the color space 310. For example, the first color model can comprise RGB, the second can comprise HSL, and the third color model can comprise LAB. In this manner, the color classification system 106 an modify the saturation of a color in the HSL color model to generate a first alternative color and map the first alternative color back to the RGB space. Similarly, the color classification system 106 can modify the lightness of the color in the LAB space to generate a second alternative color and map the first alternative color back to the RGB space.

In various embodiments, the color classification system 106 can update the color mapping table 302 to include alternative query colors of the query color. To illustrate, FIG. 4B shows an updated color mapping table 302' having additional entries added to the columns corresponding to the color names 304 and color values 306. In particular, the updated color mapping table 302' shows additional entries associated with the query color "Blue" for the alternative query colors and corresponding color values. In some embodiments, the names of the alternative query colors can indicate modified attributes of the alternative query color (e.g., "Blue_Alt1_Brightness-50%").

By maintaining the updated color mapping table 302', the color classification system 106 can reduce generating alternative query colors when the same query color is identified in a future query. Indeed, instead of regenerating one or more alternative query colors, the color classification system 106 can utilize the updated color mapping table 302' to determine that alternative query colors are already associated with the query color. In alternative embodiments, the color classification system 106 generates new alternative query colors each time a query color is identified.

As mentioned above, upon generating the alternative query color for the query color, the color classification system 106 can add the alternative query colors to the color space 310. To illustrate, FIG. 4C shows the color classification system 106 mapping the alternative query colors to the color space 310. As shown, the mapped alternative query colors 412 (i.e., AC1, AC2, AC3, and AC4) are mapped near the mapped query color 312 (i.e., QC), as the alternative query color represent variations of the query color. Further, the color space 310 shows color similarity thresholds 414 (e.g., distance thresholds) associated with mapped alternative query colors 412.

In one or more embodiments, the size (e.g., distance) of a color similarity threshold 414 for a mapped alternative query color 412 is different from the color similarity threshold 314 for the mapped query color 312. For example, the size of the color similarity threshold 414 for a mapped alternative query color 412 is smaller. In some embodiments, the size of the color similarity threshold 414 for a mapped alternative query color 412 is based on the amount of the modifications performed by the color classification system 106 at the second color model. For example, a first alternative query color that had a component modified by 50% has a smaller color similarity threshold than a second alternative query color that had a component modified by 20% (e.g., a larger modification can correspond to a larger variance from the query color resulting in false positive results).

In a number of embodiments, the mapped query color 312, the mapped alternative query colors 412, and their corresponding color similarity thresholds 314, 414 form a color similarity region 416 defining the color space 310 that indicates color similarities to the query color. Indeed, if a color is mapped to a point within the color similarity region 416, then the color classification system 106 can determine that the color matches the query color.

While the color similarity region 416 is shown as a simple two-dimensional outline, the color similarity region 416 can include holes or patches within the color similarity region 416 where the color similarity thresholds 314, 414 do not intersect. Additionally, the color similarity region 416 can be shaped to match the number of dimensions in the color space 310. For example, in three-dimensional color space, the color similarity region 416 can include a union of multidimensional spheres that intersect with each other.

FIGS. 4A-4C describe various embodiments of generating and mapping a query color and corresponding alternative query colors to a multidimensional color space. Accordingly, the actions and algorithms described in connection with FIGS. 4A-4C provide example structure and architecture for performing a step for generating a color similarity region for a target color in a multidimensional color space. For instance, at least the flow chart described in connection with FIG. 4A provides structure and/or actions for one or more of the algorithms corresponding to the color classification system 106 generating a color similarity region for a first color in a multidimensional color space.

As mentioned above, once the color classification system 106 can generate the color similarity region 416 in the color space 310 for the query color as well as identify a detected query object, the color classification system 106 can determine whether the detected query object matches the query color. Because a detected query object is made of a number of pixels, each of which could each correspond to a different color, the color classification system 106 can determine a color-matching score for the detected query object based on multiple (some or all) pixels of the detected query object.

Figure 5A:
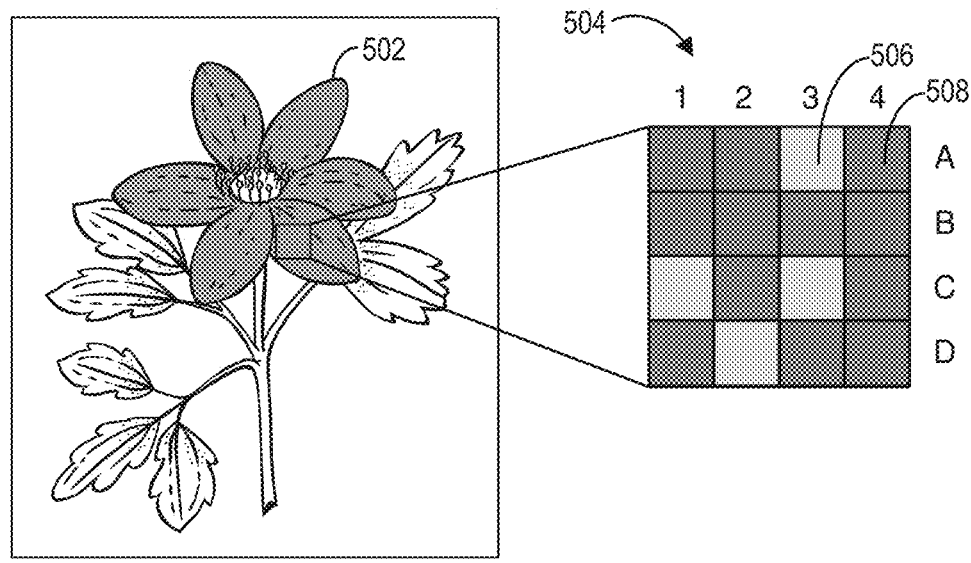

To this end, FIGS. 5A-5E show the color classification system 106 generating a color-matching score for a query object in accordance with one or more embodiments. As shown, FIG. 5A illustrates a detected query object 502 (e.g., a flower) or an instance of the detected query object. For example, the color classification system 106 detects a query of "blue flower," and in response, detects the query object 502 within the image. In various embodiments, the color classification system 106 also generates an object mask of the detected query object 502 to further isolate the pixels of the detected query object 502 from the background pixels of the image, which commonly are of a different color. Detecting a query object and generating an object mask is described further below in connection with FIGS. 9A-9D.

As mentioned above, the detected query object 502 is made up of individual pixels. For ease in explanation, FIG. 5A illustrates a magnified pixel set 504 that represents a portion of the pixels making up the detected query object 502. The magnified pixel set 504 is organized into rows and columns. Further, two representative pixels are called out in the magnified pixel set 504, a first pixel 506 and a second pixel 508.

In one or more embodiments, the color classification system 106 can generate a color-matching score based on the percentage of valid pixels within the detected query object 502. To provide context, in a number of embodiments, a valid pixel is located within the object mask (i.e., binary mask) corresponding to the detected query object 502 as well as located within the color similarity region 416 in the color space 310 (e.g., matches the query).

Figure 5B:
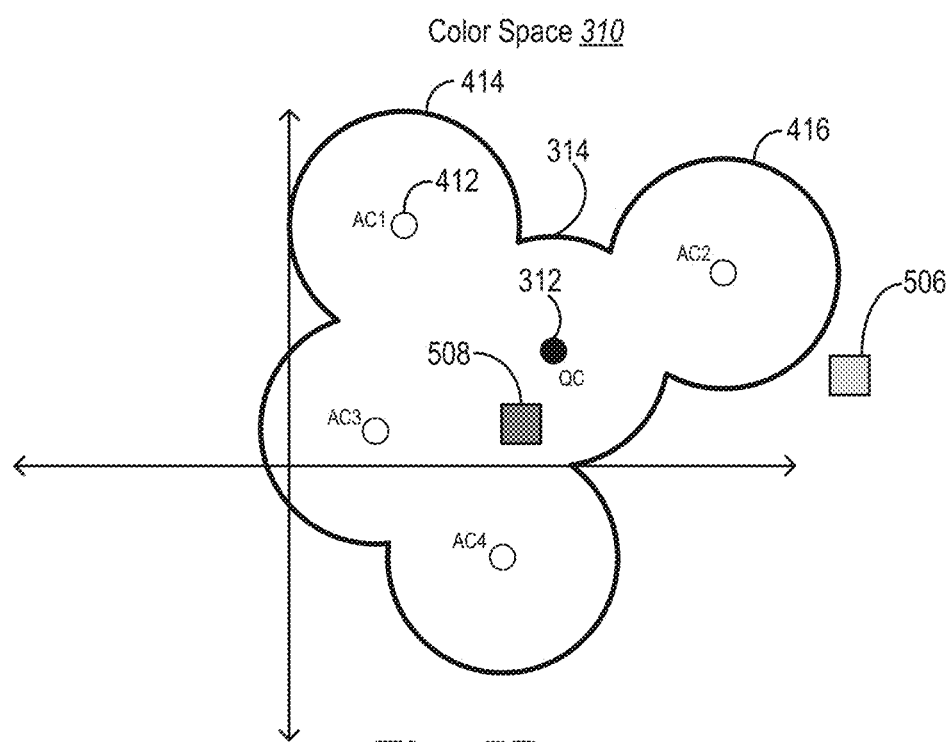

To illustrate, FIG. 5B shows the color space 310 described above, including the mapped query color 312, the mapped alternative query colors 412 and the color similarity region 416. FIG. 5B also includes a mapping of the first pixel 506 and the second pixel 508 within the color space 310 of the first color model. As shown, the first pixel 506 maps outside of the color similarity region 416, while the second pixel 508 maps inside of the color similarity region 416. Accordingly, the color classification system 106 can determine that the first pixel 506 is invalid (despite being within the object mask) and that the second pixel 508 is valid.

In one or more embodiments, the color classification system 106 can map every pixel of the detected query object 502 to the color space 310 to determine whether the pixels are valid and match the query color. In some embodiments, the color classification system 106 maps a subset of pixels. For example, the color classification system 106 systematically maps every other pixel, every third pixel, or two out of every four pixels. In another example the color classification system 106 selects a random selection of pixels up to a predetermined about of pixels (e.g., 250 pixels or 40% of the detected query object).

In a number of embodiments, the color classification system 106 can downsize or downscale the detected query object 502 before mapping pixels. For instance, the color classification system 106 combines adjacent pixels by picking a representative pixel or mergers the colors of adjacent pixels. For example, the color classification system 106 selects pixel A1 in the magnified pixel set 504 to represent the entire set. In this manner, the color classification system 106 can reduce the number of pixels of the detected query object 502, which in turn reduces the processing and memory requirements needed to determine a color-matching score. When dealing with a large volume of images and/or large image formats, such improvements to computing efficiency are significant.

For each pixel in the detected query object 502, the color classification system 106 can record whether the pixel was valid or invalid. To illustrate, FIG. 5C shows a pixel validity table 510 corresponding to the magnified pixel set 504. As shown in FIG. 5C, the pixel validity table 510 includes columns of pixels 512 (e.g., pixel identifiers), valid 514, and invalid 516. Indeed, the color classification system 106 can quickly identify each pixel in the detected query object 502 as valid or invalid based on mapping the pixel to the color space 310 and determining whether the pixel falls within the color similarity region 416.

In some embodiments, the color classification system 106 does not maintain the color similarity region 416 as shown. Instead, for a given pixel of the detected query object 502, the color similarity region 416 determines the distance between the given pixel and the locations of the mapped query color 312 and the mapped alternative query colors 412. If one of the locations is within one of the color similarity thresholds 314, 414, then the color classification system 106 determines the pixel as a valid color match. Otherwise, the color classification system 106 determines the pixel as invalid.

As mentioned above, in one or more embodiments, the color classification system 106 can determine a color-matching score for the detected query object 502 based on the amount (e.g., number or percentage) of pixels determined to be valid. In some embodiments, the color classification system 106 can determine the color-matching score as the percentage of valid pixels. To illustrate, the pixel validity table 510 indicates the percent of total valid pixels (e.g., 75%) as the color-matching score 518. In alternative embodiments, the color classification system 106 can generate a numerical value for the color-matching score based on the number of valid pixels. For example, the color classification system 106 can add 1 point to the numerical value for every 1 or 5 valid pixels identified. In some cases, the color classification system 106 normalizes the numerical value (e.g., between 1-100).

As described above, in a number of embodiments, the color classification system 106 can determine the color-matching score based on the percentage of pixels determined to be valid in the detected query object 502. In alternative embodiments, the color classification system 106 can determine the color-matching score using other and/or additional metrics. To illustrate, FIG. 5D shows a pixel color matching table 520 corresponding to the magnified pixel set 504. As shown in FIG. 5D, the pixel color matching table 520 includes columns of pixels 522 (e.g., pixel identifiers), shortest distance 524, average distance 526, and query color distance 528.

In the above embodiments, the shortest distance 524 can correspond to the shortest distance in the color space 310 between a given pixel of the detected query object 502 and either the mapped query color 312 or the closest mapped alternative query colors 412. The average distance 526 can correspond to the average distance in the color space 310 between the given pixel and the mapped query color pixels (e.g., the mapped query color 312 and the mapped alternative query colors 412). The query color distance 528 can correspond to the distance in the color space 310 between the given pixel and the mapped query color 312.

In various embodiments, the color classification system 106 can generate the color-matching score based on one or more metrics corresponding to either the shortest distance 524, the average distance 526, and/or the query color distance 528. For instance, the color classification system 106 compares query color distance 528 to a query color distance threshold to determine the shortest distance 524. In alternative embodiments, the color classification system 106 can generate the color-matching score based on a combination of the shortest distance 524, the average distance 526, and/or the query color distance 528. For example, the color classification system 106 compares each metric to a corresponding distance threshold, then combines the calculations to generate the color-matching score. In additional embodiments, the color classification system 106 can further weight each metric when calculating the color-matching score. For instance, the color classification system 106 can weigh the query color distance 528 with a greater weight (e.g., becomes more influential) than the other metric.

Based on the color-matching score, the color classification system 106 can determine whether the color of the detected query object 502 (or an instance of the detected query object), as a whole, matches the query color. As mentioned above, in some embodiments, if the color-matching score has a percentage (e.g., percentage of pixels or a normalized numerical value) or number of pixels above a color-matching threshold, then the overall color of the detected query object matches the query color. In one example, if the color-matching score is above a color-matching percent threshold of 50% (e.g., the majority of pixels match), then the color of the detected query object 502 is determined to match the query color. In other examples, if the color-matching score is above a color-matching value threshold (e.g., 50%, 75%, 80%, or 90%), then a color match exists.

In various embodiments, a user can specify a matching tolerance value. For example, based on the user lowering the color-matching tolerance, the color classification system 106 can lower the color-matching percent threshold (e.g., requiring 60% of pixels match). Similarly, if the user tightens or increases the color-matching tolerance, the color classification system 106 can raise the color-matching percent threshold (e.g., require that 80% of pixels match).

Figure 5E:
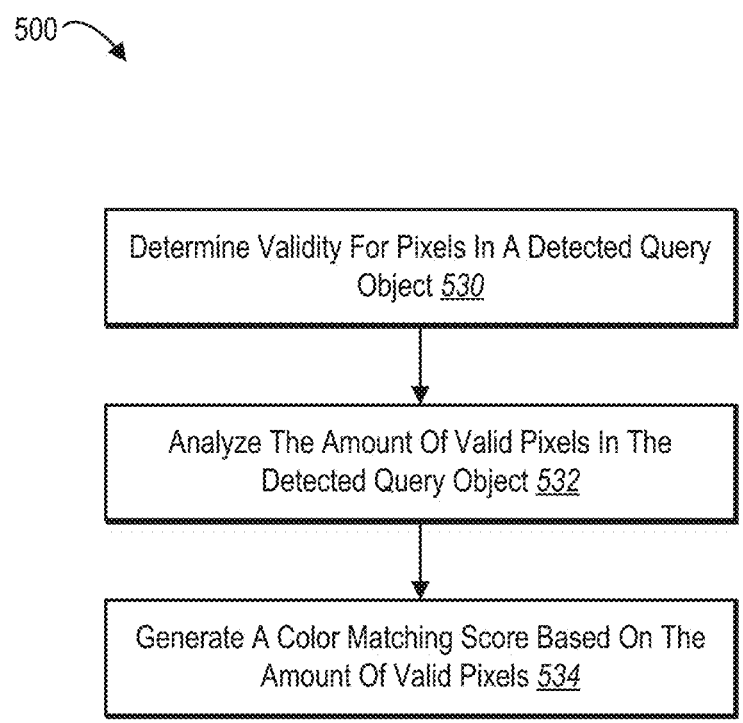

FIG. 5E illustrates a flow diagram of a series of acts 500 corresponding to generating a color-matching score for a query object, as described above with respect to FIGS. 5A-5D. In particular, the actions and algorithms described in connection with FIG. 5E provide example structure and architecture for one or more of the algorithms corresponding to performing a step for determining that the detected object matches a target color (i.e., a first color). For example, the series of acts 500 can include the act 530 of the color classification system 106 determining validity for pixels in a detected query object 502 (described above in connection with FIGS. 5A-5C). In addition, the series of acts 500 can include the act 532 of the color classification system 106 analyzing the percentage of valid pixels in the detected query object 502 (described above in connection with FIGS. 5C-5D).

In one or more embodiments, based on determining a color match with the query color, the color classification system 106 can provide the detected query object 502 or an instance of the detected query object in response to the query. In embodiments where multiple instances of the query object are detected, the color classification system 106 can apply additional filters to enhance the quality of the query results.

Figure 6:
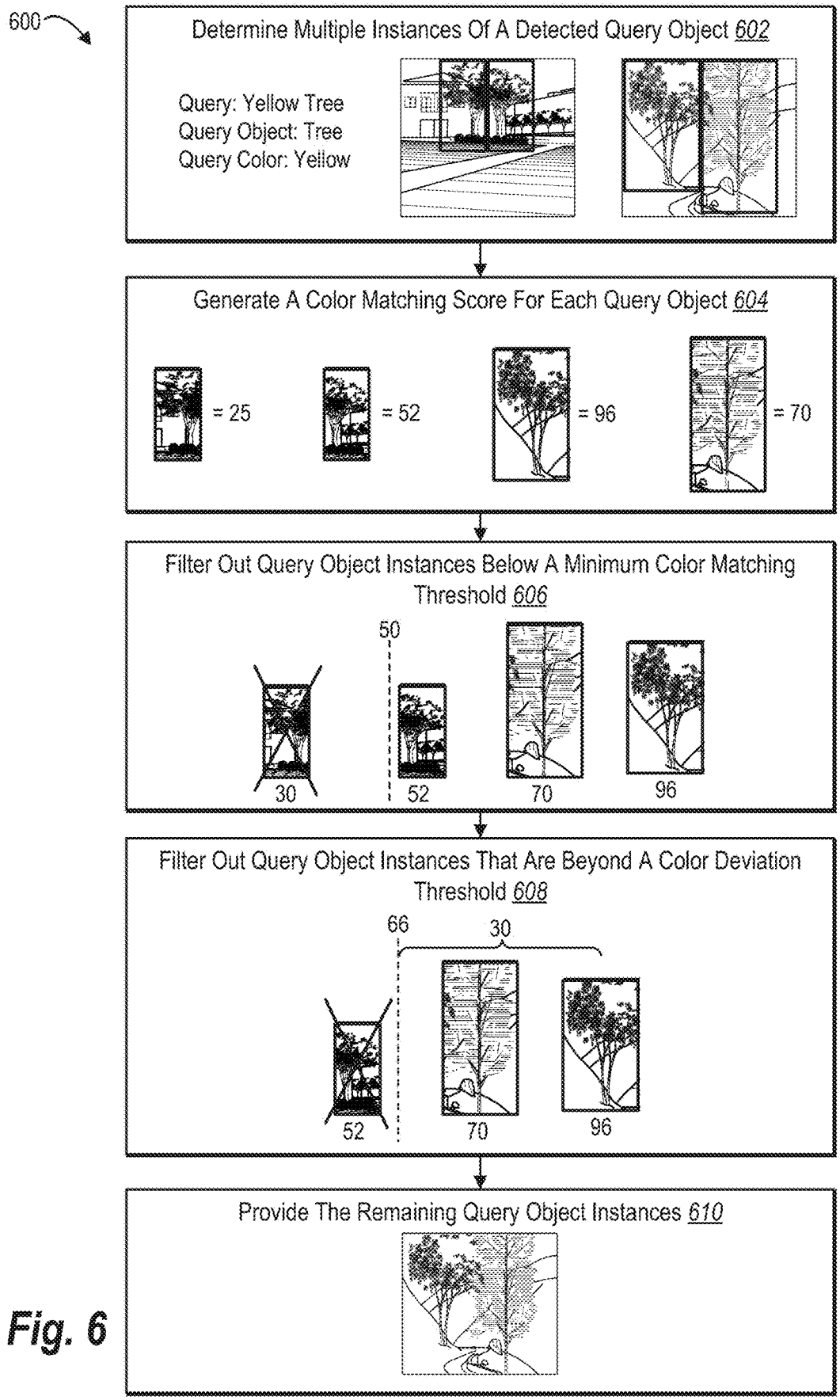
FIG. 6 illustrates a flow diagram of filtering query object instances based on color-matching scores in accordance with one or more embodiments.

To illustrate, FIG. 6 illustrates a flow diagram of filtering query object instances based on color-matching scores in accordance with one or more embodiments. In particular, FIG. 6 illustrates a series of acts 600 for selecting optimal color-matching query object instances to provide to a user. In various embodiments, the color classification system 106 can perform the series of acts 600.

As shown, the series of acts 600 can include the act 602 of the color classification system 106 determining multiple instances of a detected query object. In some embodiments, the multiple query object instances are detected within the same image. In one or more embodiments, the multiple query object instances are detected across multiple images. For example, as shown in the act 602, the color classification system 106 detects a query of "yellow tree" with the query object being "tree" and the query color being "yellow," where two instances of trees are detected in each image.

As shown, the series of acts 600 can include the act 604 of the color classification system 106 generating a color-matching score for each query object instance. For example, as described above in connection with FIGS. 5A-5D, the color classification system 106 can determine a color-matching score for each of the multiple query object instances. For instance, the color classification system 106 determines a color-matching score based on the percent of pixels matching the query color (e.g., valid pixels) determined for each query object instance, as described above.

As shown, the series of acts 600 can include the act 606 of the color classification system 106 filtering out query object instances based on a minimum color-matching threshold. As described above, the color classification system 106 can compare the color-matching score of each query object instance to a minimum color-matching threshold to determine which of the query object instances does not match the query color. For example, as shown in the act 606, by applying a minimum color-matching threshold of 50%, the color classification system 106 can filter out the lowest query object instance.

Further, as shown, the series of acts 600 can include the act 608 of the color classification system 106 filtering out query object instances that are beyond a color deviation threshold. For example, in one or more embodiments, the color classification system 106 identifies the query object instance having the highest color-matching score (i.e., 96 in the act 608). In addition, the color classification system 106 determines if any of the query object instances have color-matching scores that are below a color deviation threshold. In this manner, in some embodiments, the color deviation threshold serves as an additional color-matching threshold.

To illustrate, the act 608 shows a first query object instance with a color-matching score of 52, a second query object instance with a color-matching score of 70, a third query object instance with a color-matching score of 96, and a color deviation threshold of 30. Here, the color classification system 106 identifies the third query object instance having the highest color-matching score (96). Next, the color classification system 106 applies the color deviation threshold to the highest color-matching score to establish a new minimum color-matching threshold of 66. As a result, the color classification system 106 filters out the first query object instance (53) as being below the new minimum color-matching threshold, but keeps the second query object instance (70) and the third query object instance (96).

By applying a color deviation threshold, the color classification system 106 can increase the quality of results returned in response to a query. For example, the color deviation threshold ensures that the best match, along with close seconds, are provided as results with multiple query object instances are detected. In alternative embodiments, the color classification system 106 can return the highest result, highest x number of results, or highest y percentage of results.

As shown, the series of acts 600 can include the act 610 of the color classification system 106 of providing the remaining query object instances. For example, the color classification system 106 can provide the remaining query object instances to a user via a client device in response to the user providing the query. In another embodiment, the color classification system 106 can provide the remaining query object instances as results to a system (e.g., image search system) in response to a color-matching object search request. As shown in the act 610, the color classification system 106 provides the image with the two query object instances having the two highest color-matching scores.

Figure 7C:
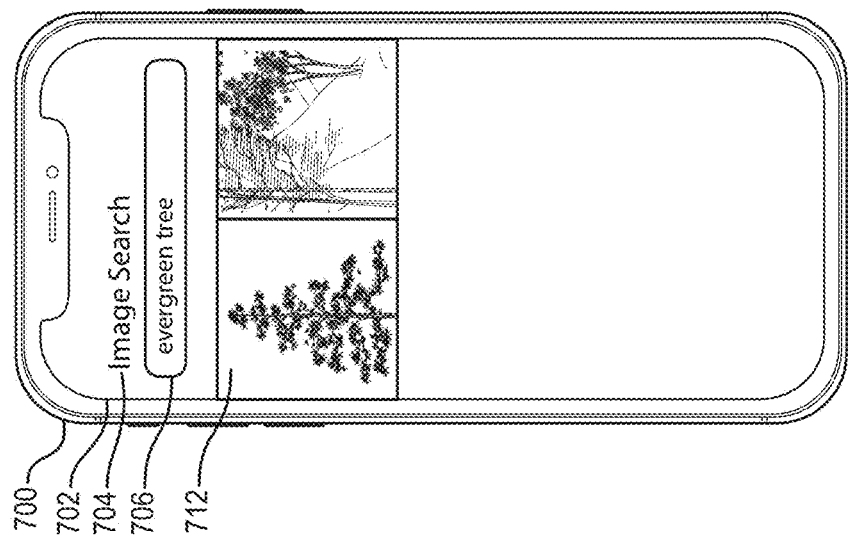
FIGS. 7A-7C illustrate a graphical user interface of identifying digital images that include the query object matching a query color in accordance with one or more embodiments.
Figure 7B:
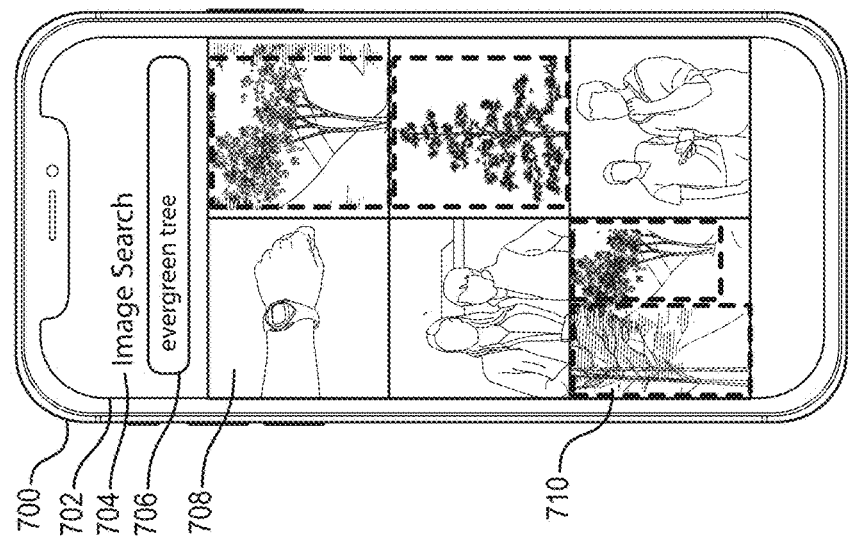
Figure 7A:
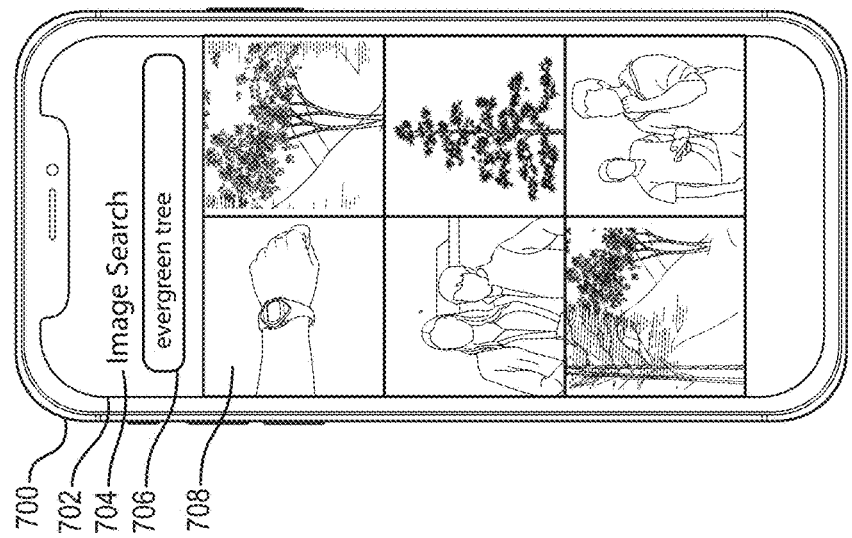
Figure 8A:
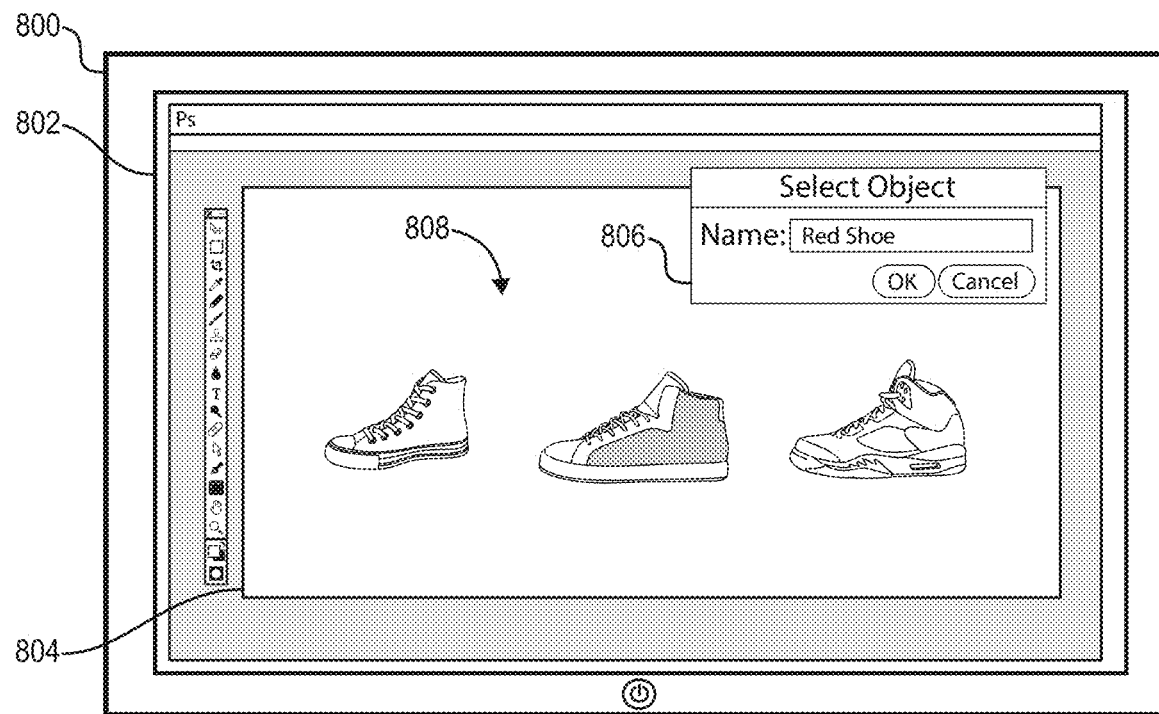
FIGS. 8A-8B illustrate a graphical user interface of detecting a query object in a digital image that matches a query color in accordance with one or more embodiments.
Figure 8B:
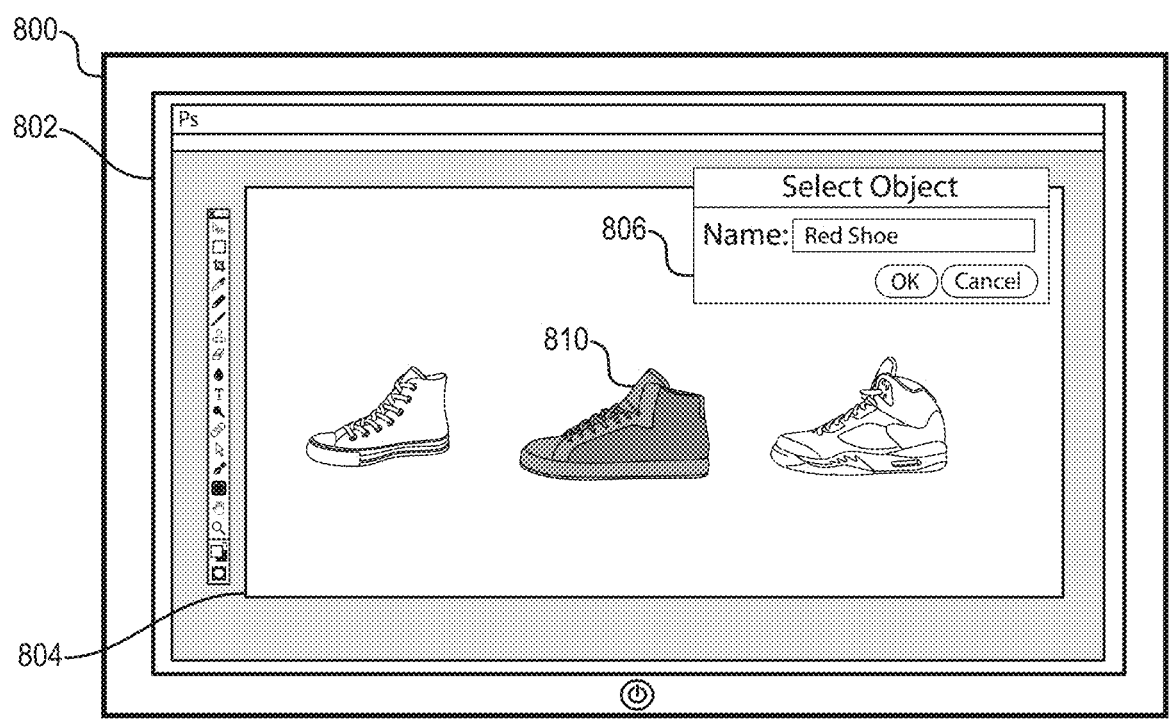

Turning now to FIGS. 7A and 8B, additional detail is provided regarding utilizing the color classification system 106 to detect color-matching query objects in images. FIGS. 7A-7C relates to a search query within an image search system. In particular, FIGS. 7A-7C relates to a search query within an image search system. FIGS. 8A-8B, described below, relate to a selection query within an image editing application.

As shown, FIGS. 7A-7C illustrate a client device 700 having a graphical user interface 702. The client device 700 in FIGS. 7A-7C can represent the client device 102 introduced above with respect to FIG. 1. As also shown, the graphical user interface 702 includes an image search interface 704 that includes a query input field 706 where a user provides a color-matching object query. Further, the image search interface 704 can include an option to submit the query (e.g., the "Search" button). In some embodiments, the image search interface 704 can also include a color selection element where a user can select a color from a set of colors.

As shown in FIG. 7A, the graphical user interface 702 includes a set of images 708 in connection with the image search interface 704. For example, the images are part of an image gallery associated with the user. In alternative embodiments, the graphical user interface 702 does not show images until image search results are provided to the user. As also shown in FIG. 7A, the color classification system 106 detects a query of "evergreen tree." For example, as described above, the color classification system 106 can parse the query string to determine a query object of "tree" and a query color of "evergreen."

In response to the query, the color classification system 106 can identify images in a set of images that include the query object. For illustrative purposes, FIG. 7B shows multiple query object instances of trees within the set of images 708, represented by bounding boxes 710 around the detected trees. In a number of embodiments, however, the color classification system 106 does not show the visualization (e.g., bounding boxes 710) in FIG. 7B to a user. Instead, the color classification system 106 jumps to the graphical user interface 702 shown in FIG. 7C.

As shown in FIG. 7C, the graphical user interface 702 can include the image search interface 704 and a subset 712 of the set of images. In particular, the subset 712 of images include search result images that the color classification system 106 determines have one or more trees matching the query color (i.e., "evergreen"). Indeed, as described above, the color classification system 106 generates a color-matching score for each of the query object instances (indicated by the bounding boxes 710 shown in FIG. 7B). Further, as described above, the color classification system 106 can determine which of the images have query object instances that match the query color based on their corresponding color-matching scores.

As mentioned above, FIGS. 8A-8B relates to a selection query within an image editing application. In particular, FIGS. 8A-8B illustrates a graphical user interface of detecting a query object in a digital image that matches a query color in accordance with one or more embodiments. For example, FIGS. 8A-8B include a client device 800 that displays the graphical user interface 802 of an image editing application. In various embodiments, the client device 800 in FIGS. 8A-8B can represent the client device 102 introduced above with respect to FIG. 1. For instance, the client device 800 includes an image editing application that implements the image selection system 104 and the color classification system 106. For example, the graphical user interface 802 in FIGS. 3A-3B can be generated by the image editing application.

As shown in FIG. 8A, the graphical user interface 802 includes an image 804 within an image editing application. For example, the image 804 shows three pairs of shoes. For ease in explanation, the image 804 is simplified not to include a background or other objects.

In addition, the graphical user interface 802 includes an object selection interface 806 where a user can request that the image editing application automatically detect and select an object within the image, including an object of a target color. As shown, the object selection interface 806 includes a query field where a user can enter in a query string (i.e., "Red Shoe") as well as options to request selection of the query (i.e., the "OK" element) or cancel the object selection interface 806 (i.e., the "Cancel" element). In some embodiments, the object selection interface 806 includes additional elements, such as a selectable option to pick a color from a set of colors.

Based on receiving a selection query that includes a query string (i.e., "red shoe"), the color classification system 106 can automatically detect and select the query object. In particular, the color classification system 106 can detect each instance of the query object 808 (e.g., shoes) in the image 804 as well as identify the particular instance specified in the query (e.g., "red" shoe). To illustrate, FIG. 8B shows the result of the color classification system 106 automatically selecting the red shoe 810 within the image 804 in response to the selection request (and/or selecting a target area of pixels/object mask corresponding to the red shoe 810). Once selected, the image editing application can enable the user to edit, copy, cut, move, and/or otherwise modify the selected object.

As mentioned above, in various embodiments, the color classification system 106 can detect a query object within an image (e.g., an instance of the query object) and/or multiple instances of a detected query object. In some embodiments, the color classification system 106 can utilize an object detection neural network to detect query object instances and/or an object mask neural network to select the detected query object, as described below in connection with the next figures.

Figure 9A:
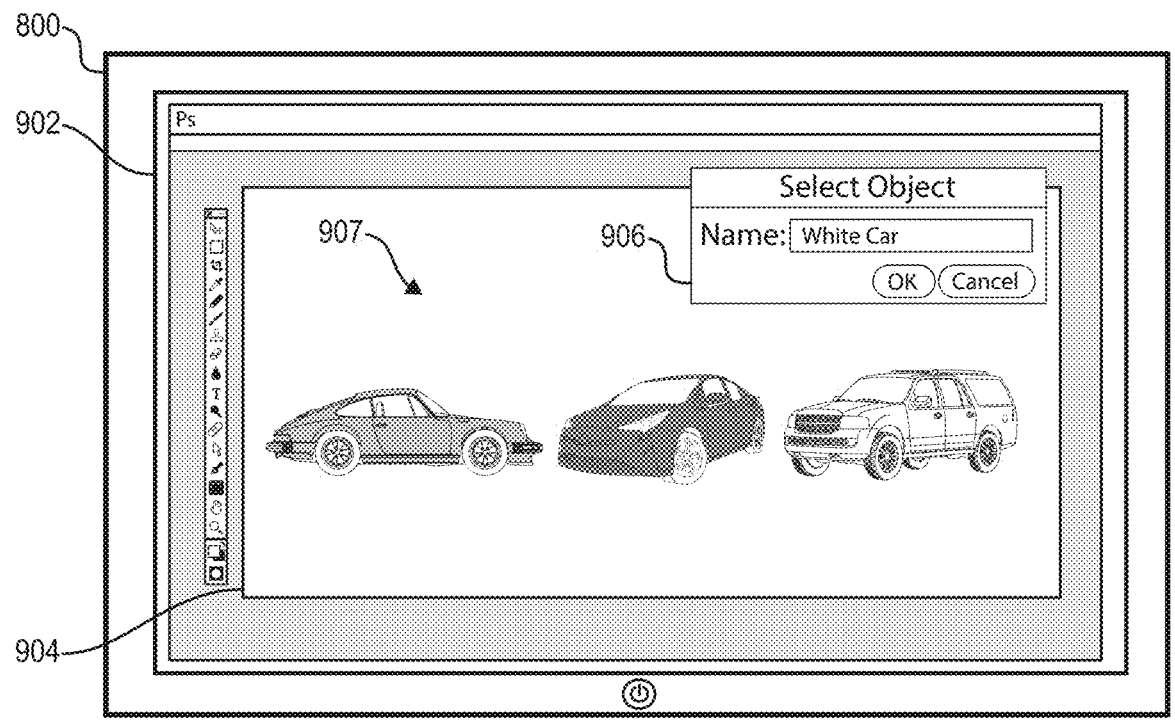
FIGS. 9A-9D illustrate a graphical user interface of detecting multiple query object instances in an image utilizing an object detection network in accordance with one or more embodiments.
Figure 9B:
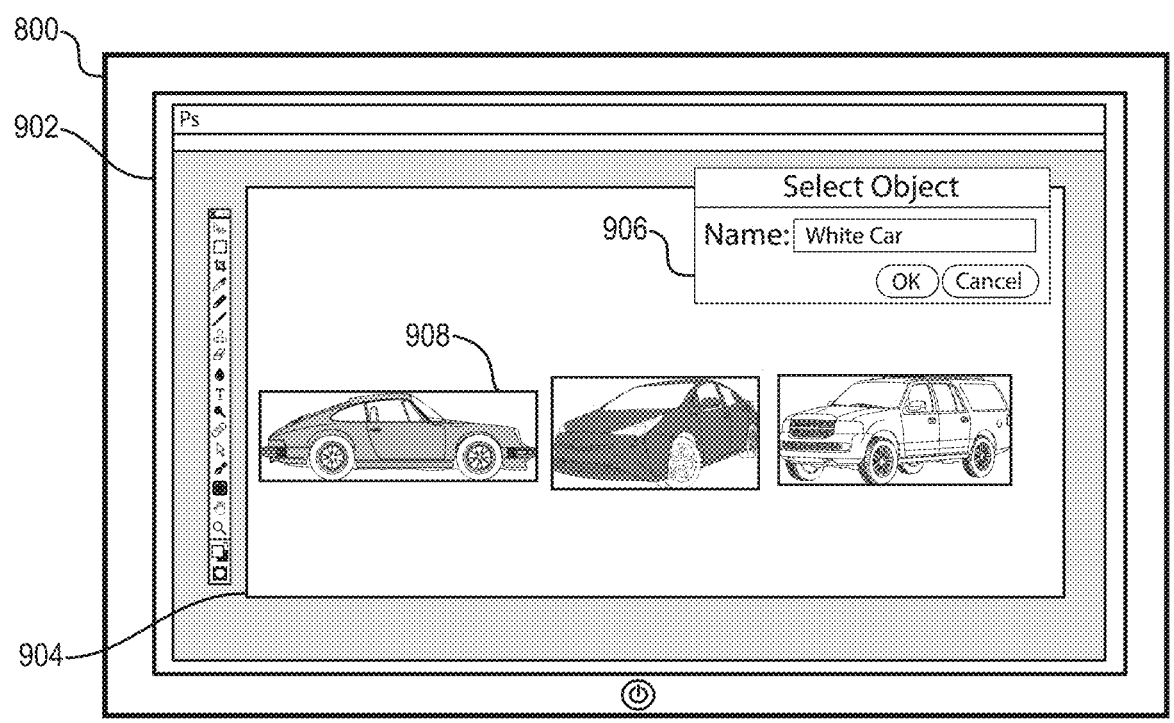
Figure 9C:
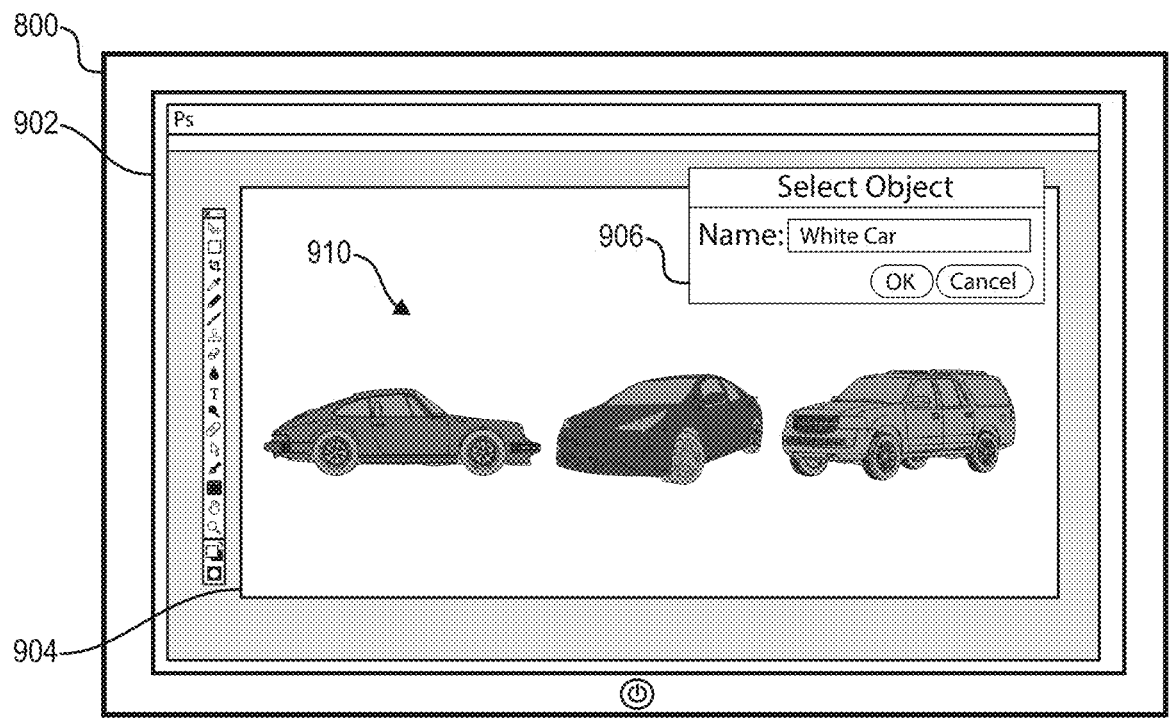

To illustrate, FIGS. 9A-9C shows a graphical user interface 902 of an image editing application that enables a user to request selection of an object in an image, including an object of a target color. For ease in explanation, FIGS. 9A-9C include the client device 800 introduced above. For example, the client device 800 includes an image editing application that implements the image selection system 104 and the color classification system 106.

As shown in FIG. 9A, the graphical user interface 902 includes an image 904 within an image editing application. The image 904 shows three cars 907, with the car on the right being white. As also shown, the image editing application includes various tools (e.g., a vertical toolbar) having selection options as well as other image editing options. In addition, the graphical user interface 902 includes an object selection interface 906, as described above in connection with FIG. 8A, where the query is "white car."

As explained previously, upon the user providing the query, the color classification system 106 can determine that the query object is "car" and the query color is "white" (e.g., utilize natural language processing identifying nouns and adjectives). In addition, the object detection neural network can determine and utilize an object detection neural network to automatically detect one or more instances of the query object in response to the selection query.

To illustrate, FIG. 9B shows the color classification system 106 utilizing an object detection neural network to identify one or more instances of the query object within the image 904. For example, if "car" is a known object, the color classification system 106 can utilize a known object class detection neural network to detect instances of cars (i.e., the query object) within the image 904. In some embodiments, the color classification system 106 utilizes a generalized object detection neural network to detect one or more instances of the query object in an image. In alternative embodiments, the color classification system 106 determines to utilize a more specific specialized object detection neural network that is trained specifically to detect particular object types or object classes.

Some examples of object detection neural networks include a specialist object detection neural network (e.g., a sky detection neural network, a face detection neural network, a body detection neural network, a skin detection neural network, and a waterfall detection neural network), an object-based concept detection neural networks, a known object class detection neural networks, and an unknown object class detection neural networks. Examples of object detection neural networks can also include sub-networks and/or supportive object detection network, such as an object proposal neural network, a regional proposal neural network, and a concept embedding neural networks.

As shown in FIG. 9B, the color classification system 106 can generate approximate boundaries (e.g., bounding boxes 908) around instances of the detected query object. For example, as part of detecting the one or more instances of the query object, the object detection neural network can create a boundary (e.g., bounding box) around each query object instance. In some cases, the boundaries provide a group or subset of pixels within the image 904 that includes a corresponding query object instance.

As shown in FIG. 9C, the color classification system 106 can generate or otherwise obtain an object mask 910 for each of the detected query object instances. For example, the color classification system 106 provides the detected object to an object mask neural network, which generates an object mask (e.g., selection mask) for the object. In particular, the color classification system 106 provides bounding boxes of the one or more query object instances to the object mask neural network. In some embodiments, the color classification system 106 can downsample pixels in the bounding boxes, as described above.

In generating an object mask for a detected query object (or each detected query object instance), the object mask neural network can segment the pixels in the detected query object from the other pixels in the image. For example, the object mask neural network can create a separate image layer that sets the pixels corresponding to the detected query object to positive (e.g., binary 1) while setting the remaining pixels in the image to a neutral or negative (e.g., binary 0). When this object mask layer is combined with the image 904, only the pixels of the detected query object are visible. Indeed, the generated object mask can provide a segmentation that enables selection of the detected query object within the image 904.

The object mask neural network can correspond to one or more deep neural networks or models that select an object based on bounding box parameters corresponding to the object within an image. For example, in one or more embodiments, the object mask neural network utilizes the techniques and approaches found in Ning Xu et al., "Deep GrabCut for Object Selection," published Jul. 14, 2017, the entirety of which is incorporated herein by reference. For example, the object mask neural network can utilize a deep grad cut approach rather than saliency mask transfer. As another example, the object mask neural network can utilize the techniques and approaches found in U.S. Patent Application Publication No. 2019/0130229, "Deep Salient Content Neural Networks for Efficient Digital Object Segmentation," filed on Oct. 31, 2017; U.S. patent application Ser. No. 16/035,410, "Automatic Trimap Generation and Image Segmentation," filed on Jul. 13, 2018; and U.S. Pat. No. 10,192,129, "Utilizing Interactive Deep Learning To Select Objects In Digital Visual Media," filed Nov. 18, 2015, each of which is incorporated herein by reference in their entirety.

Figure 9D:
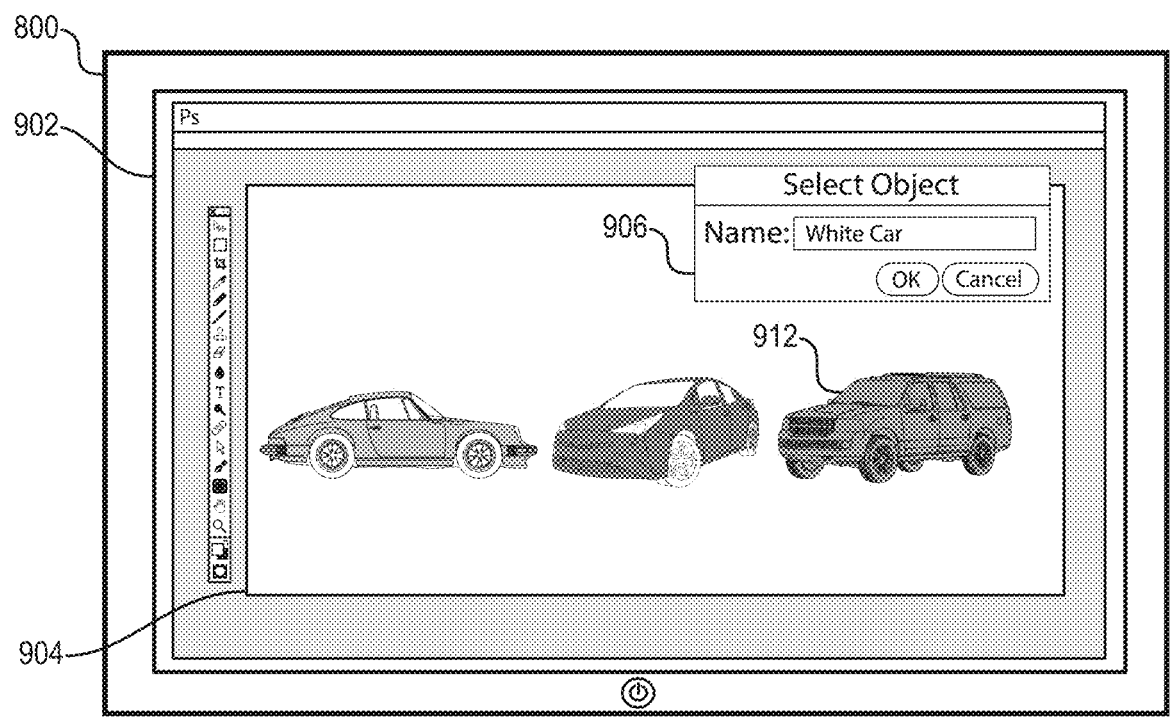

As shown in FIG. 9D, the color classification system 106 can detect which of the detected query object instances match the query color and provide that selection to the user. As described above, the color classification system 106 can utilize each object mask to generate a color-matching score based on comparing pixels within the object mask to both the query color and alternative query colors in a multidimensional color space.

In response to generating color-matching scores, the color classification system 106 can automatically select the one or more query object instances that satisfy the selection request. As shown in FIG. 9D, the color classification system 106 determines that the car on the right is white. Thus, the color classification system 106 utilizes the corresponding object mask to select the white car 912 and unselect or not select the non-white cars.

Figure 10:
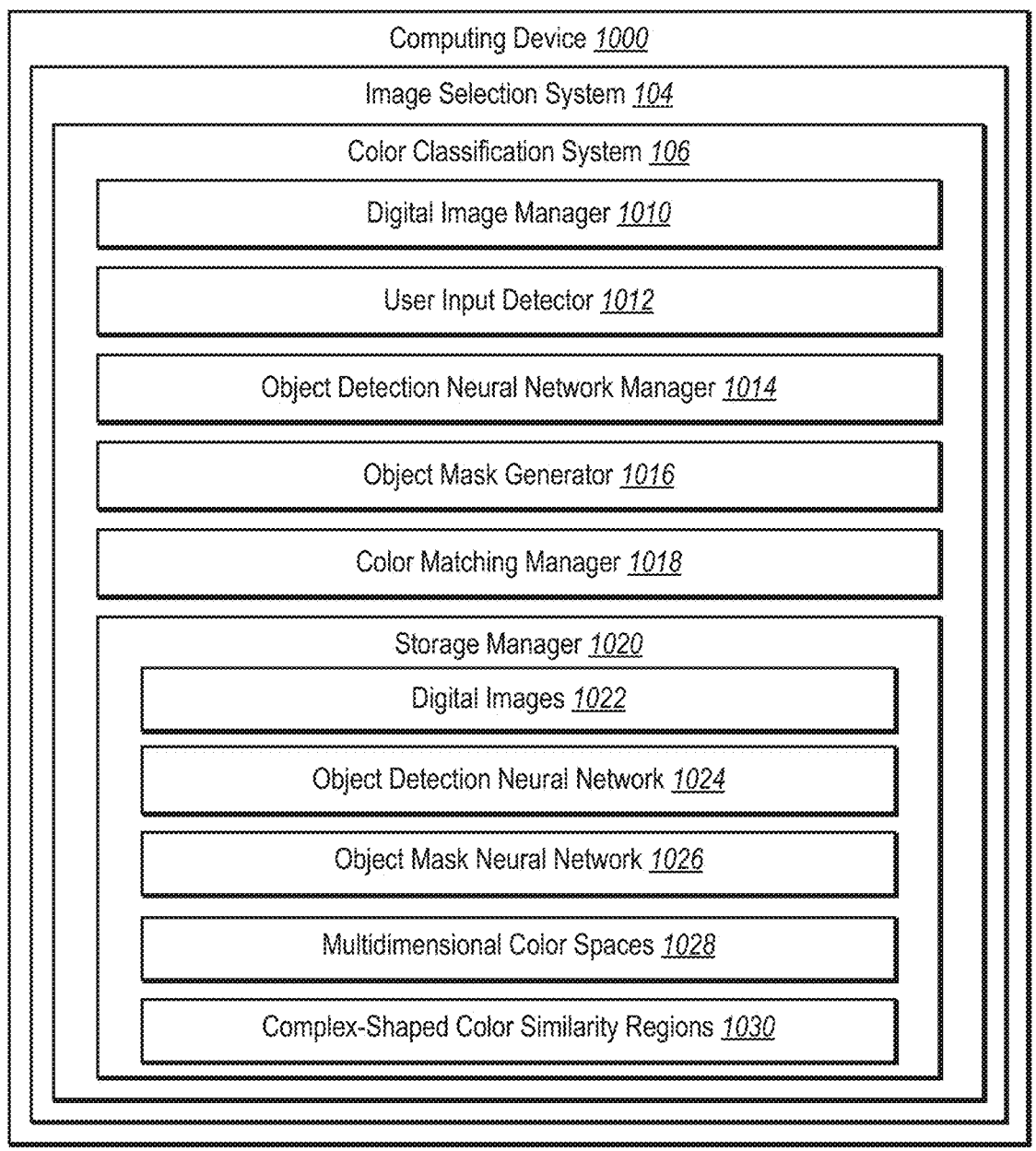
FIG. 10 illustrates a schematic diagram of an example architecture of the color classification system in accordance with one or more embodiments.

Referring now to FIG. 10, additional detail is provided regarding the capabilities and components of the color classification system 106 in accordance with one or more embodiments. In particular, FIG. 10 shows a schematic diagram of an example architecture of the color classification system 106 implemented within the image selection system 104 and hosted on a computing device 1000. The image selection system 104 can correspond to the image selection system 104 described previously in connection with FIG. 1.

As shown, the color classification system 106 is located on a computing device 1000 within an image selection system 104. In general, the computing device 1000 may represent various types of client devices. For example, in some embodiments, the client is a mobile device, such as a laptop, a tablet, a mobile telephone, a smartphone, etc. In other embodiments, the computing device 1000 is a non-mobile device, such as a desktop or server, or another type of client device. Additional details with regard to the computing device 1000 are discussed below as well as with respect to FIG. 13.

As illustrated in FIG. 10, the color classification system 106 includes various components for performing the processes and features described herein. For example, the color classification system 106 includes a digital image manager 1010, a user input detector 1012, an object detection neural network manager 1014, an object mask generator 1016, a color matching manager 1018 and a storage manager 1020. As shown, the storage manager 1020 includes digital images 1022, an object detection neural network 1024, an object mask neural network 1026, multidimensional color spaces 1028, and color similarity regions 1030. Each of the components mentioned above is described below in turn.

As mentioned above, the color classification system 106 includes the digital image manager 1010. In general, the digital image manager 1010 facilitates identifying, accessing, receiving, obtaining, generating, importing, exporting, copying, modifying, removing, and organizing images. In one or more embodiments, the digital image manager 1010 operates in connection with an image selection system 104 (e.g., an images search system and/or an image editing application) to access, edit, and search for images, as described previously. In some embodiments, the digital image manager 1010 communicates with the storage manager 1020 to store and retrieve the digital images 1022, for example, within a digital image database managed by the storage manager 1020.

As shown, the color classification system 106 includes the user input detector 1012. In various embodiments, the user input detector 1012 can detect, receive, and/or facilitate user input on the computing device 1000 in any suitable manner. In some instances, the user input detector 1012 detects one or more user interactions (e.g., a single interaction, or a combination of interactions) with respect to a user interface. For example, the user input detector 1012 detects a user interaction from a keyboard, mouse, touch page, touch screen, and/or any other input device in connection with the computing device 1000. For instance, the user input detector 1012 detects user input of a query (e.g., a selection query or an image search query) submitted from an object selection request interface requesting automatic detection and/or selection of a color-matched object within an image.

As shown, the color classification system 106 includes the object detection neural network manager 1014. In various embodiments, the object detection neural network manager 1014 maintains, creates, generates, trains, updates, accesses, and/or utilizes the object detection neural networks disclosed herein. As described above, the object detection neural network manager 1014 detects one or more objects within an image (e.g., a query object) and generates a boundary (e.g., a bounding box) to indicate the detected object.

In addition, in a number of embodiments, the object detection neural network manager 1014 can communicate with the storage manager 1020 to store, access, and utilize the object detection neural network 1024. As mentioned above, in various embodiments, the object detection neural network 1024 can include one or more specialist object detection neural networks, object-based concept detection neural networks, known object class detection neural networks, unknown object class detection neural networks, object proposal neural networks, regional proposal neural networks, concept embedding neural networks.

In addition, as shown, the color classification system 106 includes the object mask generator 1016. In one or more embodiments, the object mask generator 1016 produces, creates, and/or generates accurate object masks from detected objects. For example, the object detection neural network manager 1014 provides a boundary of an object (e.g., a detected query object) to the object mask generator 1016, which utilizes the object mask neural network 1026 to generate an object mask of the detected object, as described above. As also explained above, in various embodiments, the object mask generator 1016 generates multiple object masks when multiple instances of the query object are detected.

As also shown, the color classification system 106 includes the color matching manager 1018. In some embodiments, the color matching manager 1018 determines, analyzes, detects, identifies, matches, maps, plots, filters, and/or selects one or more particular instances of a detected object from multiple instances of the detected object based on a query color. In various embodiments, the color matching manager 1018 utilizes a multidimensional color spaces 1028 and/or one or more color models to identify an instance of a target color, as described above.

In one or more embodiments, the color matching manager 1018 generates color similarity regions 1030 for multiple colors. For example, the color matching manager 1018 builds one or more color similarity regions for each color in a set of colors (e.g., colors in a color deck). In this manner, when classifying the color of an object, the color matching manager 1018 can compare pixel mappings from the object to the previously generated color similarity regions 1030 to determine a color match.

Each of the components 1010-1030 of the color classification system 106 can include software, hardware, or both. For example, the components 1010-1030 can include one or more instructions stored on a computer-readable storage medium and executable by processors of one or more computing devices, such as a client device (e.g., a mobile client device) or server device. When executed by the one or more processors, the computer-executable instructions of the color classification system 106 can cause a computing device to perform the feature learning methods described herein. Alternatively, the components 1010-1030 can include hardware, such as a special-purpose processing device to perform a certain function or group of functions. In addition, the components 1010-1030 of the color classification system 106 can include a combination of computer-executable instructions and hardware.

Furthermore, the components 1010-1030 of the color classification system 106 may be implemented as one or more operating systems, as one or more stand-alone applications, as one or more modules of an application, as one or more plug-ins, as one or more library functions or functions that may be called by other applications, and/or as a cloud-computing model. Thus, the components 1010-1030 may be implemented as a stand-alone application, such as a desktop or mobile application. Additionally, the components 1010-1030 may be implemented as one or more web-based applications hosted on a remote server. The components 1010-1030 may also be implemented in a suite of mobile device applications or "apps." To illustrate, the components 1010-1030 may be implemented in an application, including but not limited to ADOBE PHOTOSHOP, ADOBE ELEMENTS, ADOBE INDESIGN, ADOBE ACROBAT, ADOBE ILLUSTRATOR, ADOBE STOCK, ADOBE AFTER EFFECTS, ADOBE PREMIERE PRO, CREATIVE CLOUD software, BEHANCE. The foregoing are either registered trademarks or trademarks of Adobe Systems Incorporated in the United States and/or other countries.

FIGS. 1-10, the corresponding text, and the examples provide a number of different methods, systems, devices, and non-transitory computer-readable media of the color classification system 106. In addition to the foregoing, one or more embodiments can also be described in terms of flowcharts comprising acts for accomplishing a particular result, such as the flowcharts of acts shown in FIG. 11 and FIG. 12. Additionally, the acts described herein may be repeated or performed in parallel with one another or parallel with different instances of the same or similar acts.

Figure 11:
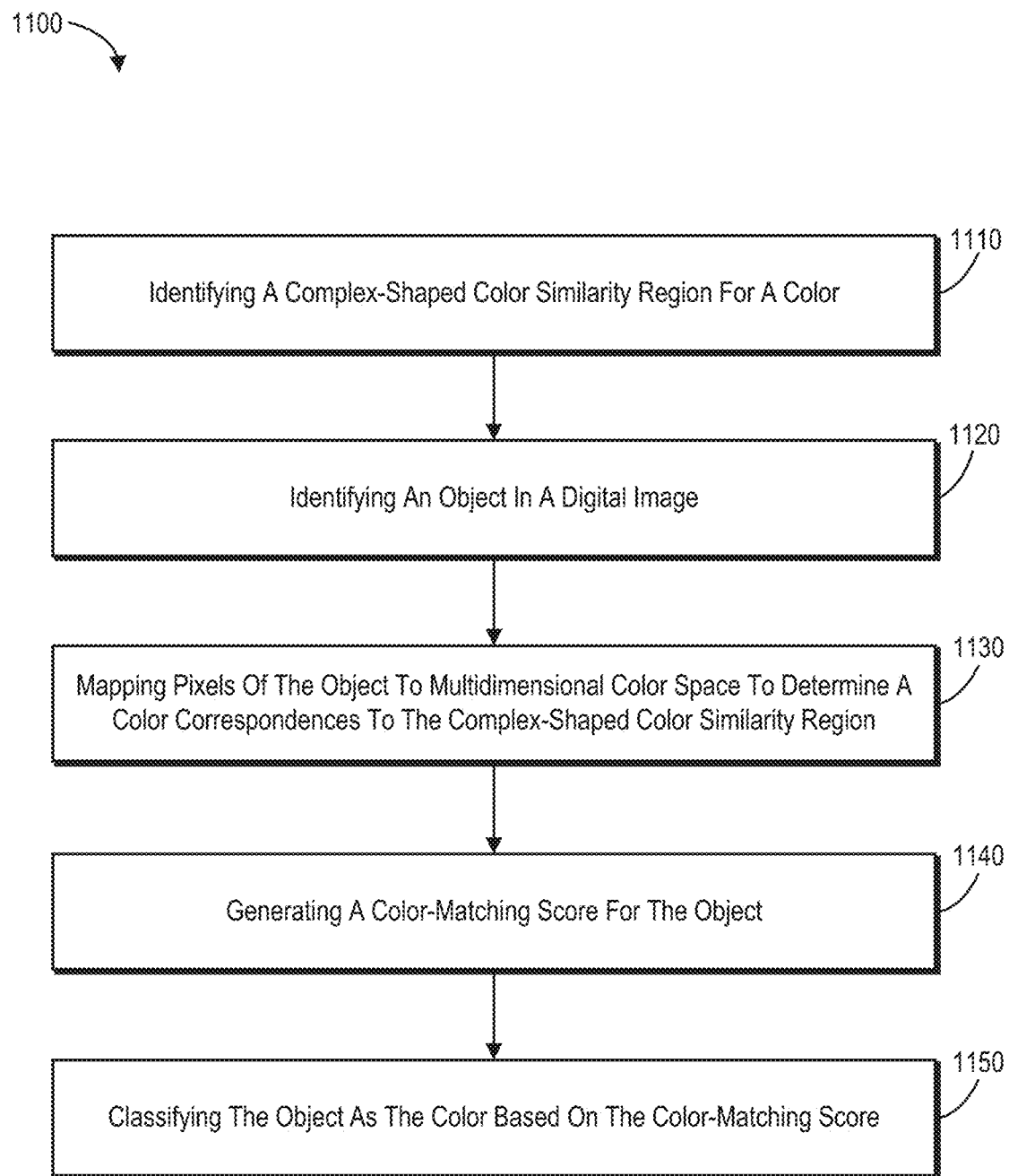
FIG. 11 illustrates a flowchart of a series of acts for classifying the color of objects in digital images in accordance with one or more embodiments.
Figure 12:
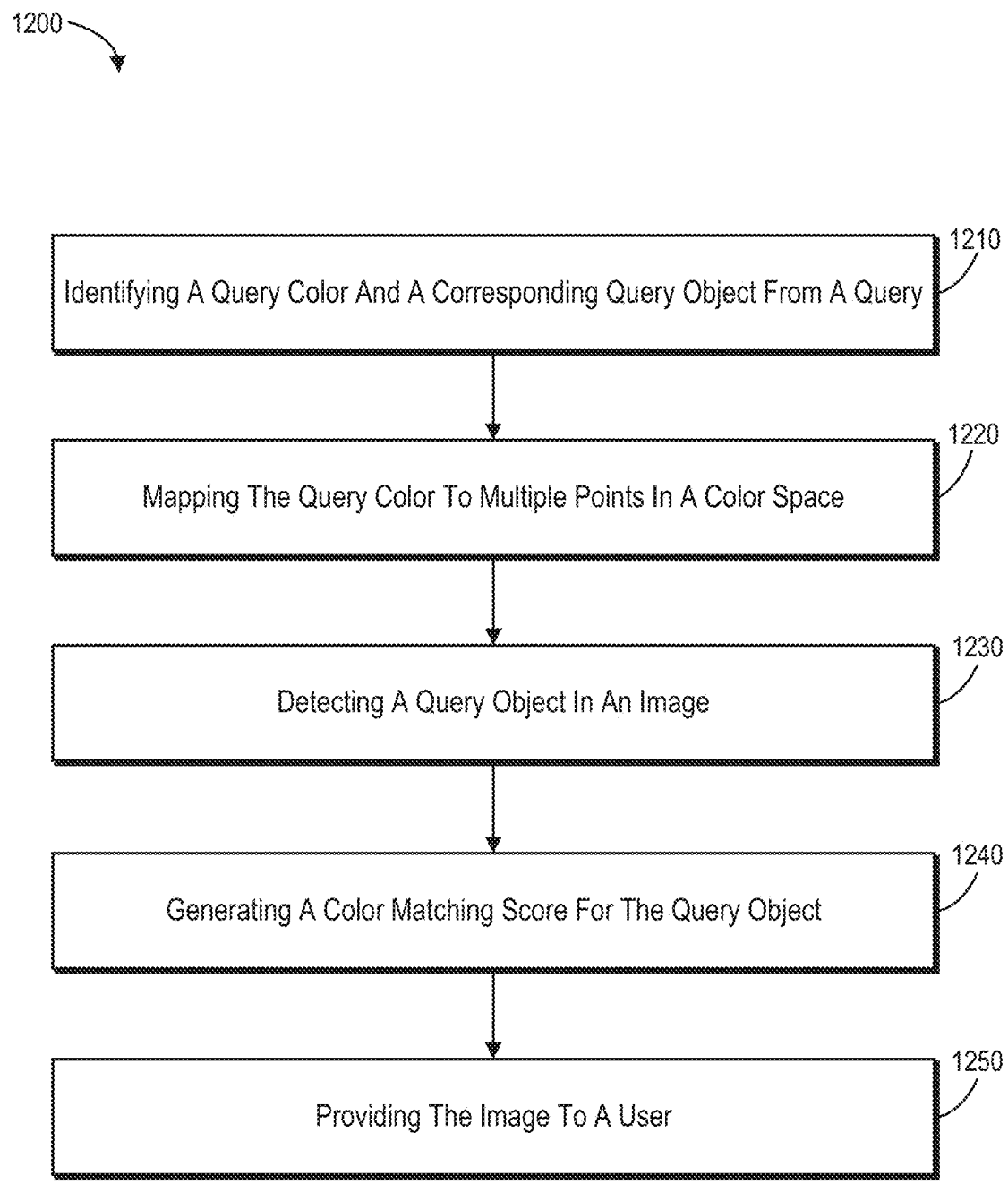
FIG. 12 illustrates a flowchart of a series of acts for detecting query objects corresponding to query colors in digital images in accordance with one or more embodiments.

As mentioned, FIG. 11 and FIG. 12 illustrate a flowchart of a series of acts 1100, 1200 for utilizing the color classification system 106 in accordance with one or more embodiments. While FIG. 11 and FIG. 12 illustrate acts according to one embodiment, alternative embodiments may omit, add to, reorder, and/or modify any of the acts shown in FIG. 11 and FIG. 12. The acts of FIG. 11 and FIG. 12 can be performed as part of a method. Alternatively, a non-transitory computer-readable medium can comprise instructions that, when executed by one or more processors, cause a computing device to perform the acts of FIG. 11 and FIG. 12. In some embodiments, a system can perform the acts of FIG. 11 and FIG. 12.

Turning now to FIG. 11, in one or more embodiments, the series of acts 1100 is implemented on one or more computing devices, such as the client devices 102, 700, 800, the server device 110, or the computing device 1000. In addition, in some embodiments, the series of acts 1100 is implemented in a digital environment for classifying colors of objects in digital images. In various embodiments, the series of acts 1100 is implemented in a digital environment for detecting instances of objects in digital images. For example, the series of acts 1100 is implemented on a computing device having memory that includes a digital image, a color similarity region for a color within a multidimensional color space comprising a plurality of mapped alternative color points mapped in the multidimensional color space, and an object mask neural network.

The series of acts 1100 can include an act 1110 of identifying a color similarity region for a color. In some embodiments, the act 1110 can involve identifying one or more color similarity regions for one or more colors within a multidimensional color space. In various embodiments, the act 1110 can include utilizing a trained object detection neural network to detect the object. In one or more embodiments, the act 1110 involves identifying a first color similarity region corresponding to the first color of the one or more colors, which includes one or more mapped alternative versions of the first color mapped within the multidimensional color space.

In some embodiments, the act 1110 can include generating an alternative version of the first color by converting a copy of the first color from a first color model corresponding to the multidimensional color space to a second color model, modifying one or more color attributes of the first color copy within the second color model, and converting the first color copy with the modified one or more color attributes from the second color model back to the first color model corresponding to the multidimensional color space.

In one or more embodiments, the act 1110 can include generating a first color similarity region for the first color of the one or more colors, which includes a plurality of mapped alternative color points corresponding to the first color mapped to the multidimensional color space. In particular embodiments, the act 1110 can include identifying a query color and a corresponding query object from a query, where the query color corresponds to the first color and where the query object corresponds to the object as well as include mapping the query color to a plurality of points in a multidimensional color space to generate a first color similarity region for the query color.

As shown, the series of acts 1100 also includes an act 1120 of identifying an object in a digital image. In particular, the act 1120 can involve identifying an object in a digital image, including a plurality of pixels. In some embodiments, the act 1120 can include utilizing an object mask neural network to isolate and identify the plurality of pixels associated with the object within the digital image.

As shown in FIG. 11, the series of acts 1100 further includes an act 1130 of mapping pixels of the object to multidimensional color space to determine a color correspondence to the color similarity region. In particular, the act 1130 can include mapping pixels of the plurality of pixels to the multidimensional color space to determining one or more color correspondences to the one or more color similarity regions. In various embodiments, the act 1130 can include mapping the pixels of the plurality of pixels to within the color similarity regions for the colors to determine to which colors the mapped object pixels correspond.

As shown, the series of acts 1100 also includes an act 1140 of generating a color-matching score for the object. In particular, the act 1140 can include generating one or more color-matching scores for the object based on the one or more color correspondences between the pixels of the plurality of pixels and the one or more colors. In some embodiments, the act 1140 includes determining the number or amount of pixels of the mapped object pixels that reside within each color similarity region for each of the colors and generating more favorable (e.g., higher) scores for color similarity regions that include more mapped object pixels (e.g., the color similarity region having the most mapped object pixels receives the highest color-matching score.

In some embodiments, the act 1140 can include determining an amount of valid pixels of the plurality of pixels by comparing each of the plurality of pixels of the object in the multidimensional color space to the plurality of mapped alternative color points corresponding to the color and/or determining that the object satisfies a minimum color-matching threshold for the color based on the amount of valid pixels.

In one or more embodiments, the act 1140 can include generating a first color-matching score for the object based on determining distances in the multidimensional color space between each of the pixels of the plurality of pixels and each of the plurality of mapped color points corresponding to the first color. In various embodiments, the act 1140 is associated with downsampling the pixels of the plurality of pixels before mapping the pixels to the multidimensional color space or generating the one or more color-matching scores for the object In some embodiments, the act 1140 can include assigning, for each of the pixels of the plurality of pixels, the pixel as valid based on the pixel being within a minimum threshold distance to at least one of the plurality of mapped color points corresponding to the first color and determining that the object matches the first color based on identifying a minimum amount of pixels of the object being assigned as valid.

As shown, the series of acts 1100 also includes an act 1150 of classifying the object as the color based on the color-matching score. In particular, the act 1150 can involve classifying the object as a first color of the one or more colors based on the one or more color-matching scores. In various embodiments, the act 1150 can include classifying the object as the color based on the minimum color-matching threshold for the color being satisfied The series of acts 1100 can also include a number of additional acts. In some embodiments, the series of acts 1100 can include the acts of receiving a search request for the object having the first color, detecting a plurality of digital images that include the object, generating a color-matching score for the object detected within each of the plurality of digital images with respect to the first color, identifying a subset of digital images that include a color-matching score satisfying the minimum color-matching threshold for the first color, and providing the subset of digital images to a client device associated with the user.

In various embodiments, the series of acts 1100 can include the acts of detecting a plurality of instances of the object within the digital image, generating an additional color-matching score for each instance of the object, and returning one or more instances of the object as having the first color based on the color matching scores.

In one or more embodiments, the series of acts 1100 can include the acts detecting multiple object instances of the object in the digital image utilizing the trained object detection neural network, generating color matching scores for each of the multiple object instances by comparing pixels for each of the multiple object instances in the multidimensional color space to the plurality of mapped alternative color points corresponding to the color, and determining a subset of object instances from the multiple object instances by filtering out object instances from the multiple object instances that fail to satisfy a minimum color-matching threshold.

In additional embodiments, the series of acts 1100 can include the acts of identifying a first object instance from the subset of object instances having a highest color-matching score, determining an additional minimum color-matching threshold based on the highest color-matching score of the object instance, and filtering out object instances from the subset of object instances that fail to satisfy the additional minimum color-matching threshold. In further embodiments, the series of acts 1100 can include the act of providing the digital image with the filtered subset of object instances selected to a client device associated with a user.

Turning now to FIG. 12, in one or more embodiments, the series of acts 1200 is implemented on one or more computing devices, such as the client devices 102, 700, 800, the server device 110, or the computing device 1000. In addition, in some embodiments, the series of acts 1200 is implemented in a digital environment for creating or editing digital content (e.g., digital images). In various embodiments, the series of acts 1200 is implemented in a digital environment for detecting instances of objects in digital images. For example, the series of acts 1200 is implemented on a computing device having memory that includes a digital image, a selection query comprising a query color and a corresponding query object, and a trained object mask neural network.

The series of acts 1200 can include an act 1210 of identifying a query color and a corresponding query object from a query. In some embodiments, the act 1210 can involve identifying a query string that includes a query object to be selected in a digital image and a query color corresponding to the query object. In some embodiments, the act 1210 also includes analyzing the query string to identify a noun indicating the query object and an adjective indicating the query color.

As shown, the series of acts 1200 also includes an act 1220 of mapping the query color to multiple points in a color space. In particular, the act 1220 can involve mapping the query color to a plurality of points in a multidimensional color space. In some embodiments, the plurality of points in the multidimensional color space includes one or more alternative versions of the query color. In some embodiments, the plurality of points in multidimensional color space is based on an array of different color brightness levels corresponding to the query color. In various embodiments, the act 1220 can include mapping the query color to a plurality of points in a multidimensional color space utilizing a color mapping machine-learning model.

In example embodiments, the act 1220 can include generating an alternative version of the query color by converting a copy of the query color from a first color model corresponding to the multidimensional color space to an alternative color model, modifying one or more color attributes of the query color copy within the alternative color model, and converting the modified query color copy from the alternative color model back to the color model corresponding to the multidimensional color space. In some embodiments, the one or more color attributes of the query color copy within the alternative color model include a color brightness, a color hue, or a color saturation level. In additional embodiments, the act 1220 can include modifying the one or more color attributes of the query color copy within the alternative color model by reducing a brightness level of the query color copy in the alternative color model.

As shown in FIG. 12, the series of acts 1200 further includes an act 1230 of detecting a query object in an image. In particular, the act 1230 can include detecting a query object in a digital image utilizing a trained object detection neural network. In one or more embodiments, the act 1230 can include generating an object mask for the query object to encompass the pixels of the query object. In some embodiments, the act 1230 can also include downsampling the pixels of the query object before generating a color-matching score for the query object.

As shown, the series of acts 1200 also includes an act 1240 of generating a color-matching score for the query object. In particular, the act 1240 can include generating a color-matching score for the query object based on comparing pixels of the query object in the multidimensional color space to the plurality of mapped points corresponding to the query color. In one or more embodiments, the act 1240 is based on determining distances in the multidimensional color space between each of the pixels of the query object and each of the plurality of mapped points corresponding to the query color.

In various embodiments, the act 1240 includes assigning, for each pixel of the query object, the pixel as valid based on the pixel being within a minimum threshold distance to at least one of the plurality of mapped points corresponding to the query color and determining that the query object matches the query color based on identifying a minimum amount of pixels of the query object being assigned as valid.

As shown, the series of acts 1200 also includes an act 1250 of providing the image to a user. In particular, the act 1250 can involve providing, based on determining that the color-matching score satisfies a minimum color-matching threshold, the digital image to a client device associated with a user. In a number of embodiments, the act 1250 can include determining that the query object instance matches the query color based on the color-matching score satisfying the minimum color-matching threshold.

The series of acts 1200 can also include a number of additional acts. In one or more embodiments, the series of acts 1200 can include the acts of detecting a plurality of digital images that include the query object, generating a color-matching score for a query object detected within each of the plurality of digital images, identifying a subset of digital images that include a color-matching score satisfying the minimum color-matching threshold, and providing the subset of digital images to the client device associated with the user.

In some embodiments, the series of acts 1200 can include the acts of detecting an additional query object in the image utilizing the trained object detection neural network in connection with detecting the query object, generating an additional color-matching score for the additional query object, determining that the additional color-matching score does not satisfy the minimum color-matching threshold, and based on the query object satisfying the minimum color-matching threshold and the additional color-matching score not satisfying the minimum color-matching threshold, selecting the query object within the image. In additional embodiments, the series of acts 1200 can include providing the digital image by automatically selecting the query object within the digital image utilizing the object mask and/or performing additional operations (e.g., editing the object, such as automatically removing the object).

In some embodiments, the series of acts 1200 can include additional or alternative acts. For example, in some embodiments, the acts 1200 can include mapping the query color to a plurality of points in a multidimensional color space; detecting multiple instances of the query object in the digital image utilizing the trained object detection neural network; generating color-matching scores for each of the multiple query object instances by comparing pixels for each of the multiple query object instances in the multidimensional color space to the plurality of mapped points corresponding to the query color; determining a subset of query object instances from the multiple query object instances by filtering out query object instances from the multiple query object instances that fail to satisfy a minimum color-matching threshold; and providing the digital image with the subset of query object instances selected to a client device associated with a user.

In additional embodiments, the series of acts 1200 can include identifying a query object instance from the subset of query object instances having a highest color-matching score, determining an additional minimum color-matching threshold based on the highest color-matching score of the query object instance, and filtering out query object instances from the subset of query object instances that fail to satisfy the additional minimum color-matching threshold.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the color classification system to detect instances of a detected query object that matches a query color as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
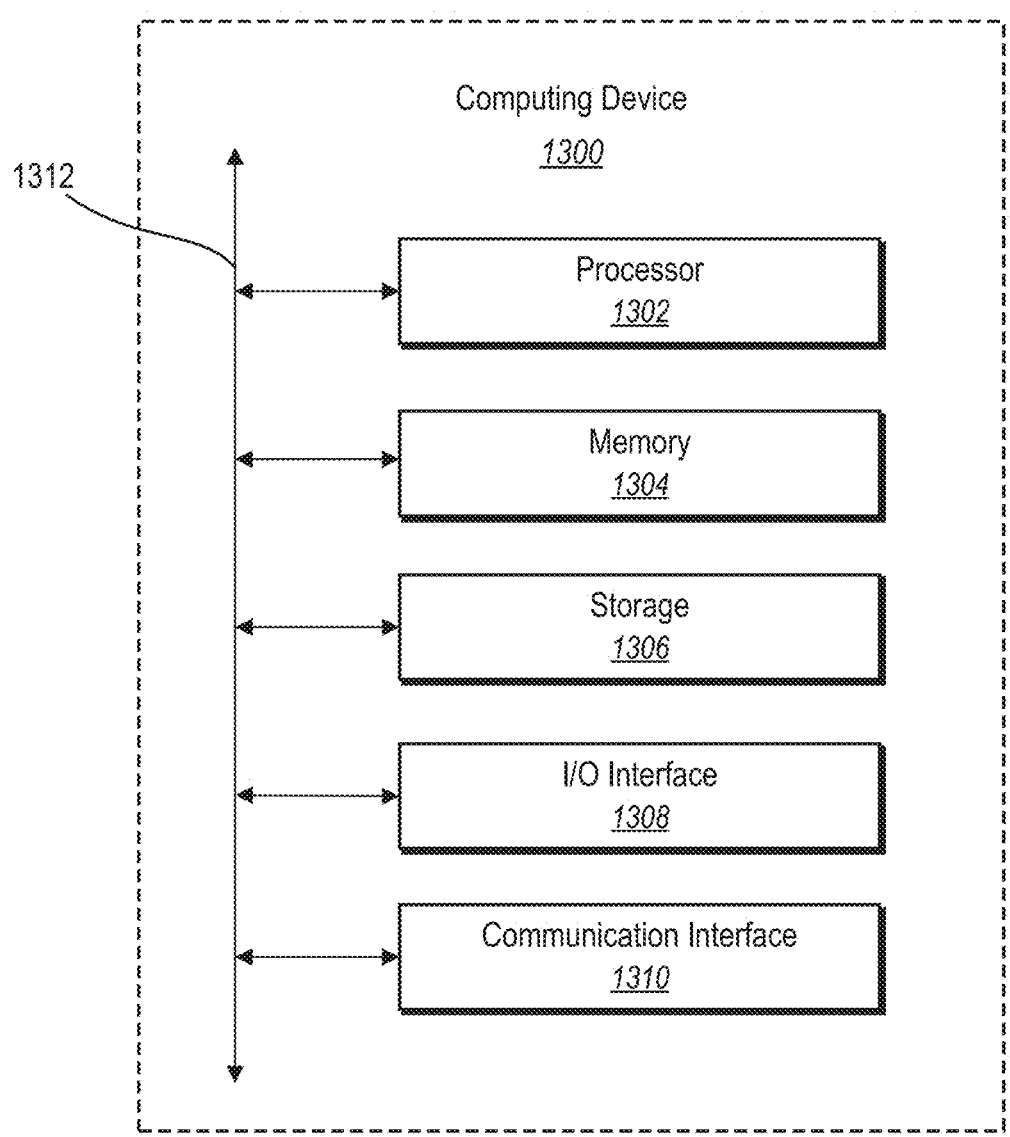
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices, such as the computing device 1300 may represent the computing devices described above (e.g., client devices 102, 700, 800, the server device 120, or the computing device 1000). In one or more embodiments, the computing device 1300 may be a mobile device (e.g., a laptop, a tablet, a smartphone, a mobile telephone, a camera, a tracker, a watch, a wearable device, etc.). In some embodiments, the computing device 1300 may be a non-mobile device (e.g., a desktop computer, a server device, a web server, a file server, a social networking system, a program server, an application store, or a content provider). Further, the computing device 1300 may be a server device that includes cloud-based processing and storage capabilities.

As shown in FIG. 13, the computing device 1300 can include one or more processor(s) 1302, memory 1304, a storage device 1306, input/output ("I/O") interfaces 1308, and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (e.g., user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of these I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   generate a multidimensional color space for a plurality of colors comprising a plurality of color similarity regions each associated with a color name, the multidimensional color space comprising a first color similarity region associated with a first color name that groups regions of one or more alternative versions of a first color and a region of the first color within the multidimensional color space;
   identify an object in a digital image comprising a plurality of pixels;
   map pixels of the plurality of pixels to the multidimensional color space to determine one or more color correspondences to one or more color similarity regions of the plurality of color similarity regions and corresponding to one or more color names;
   generate one or more color-matching scores for the object based on the one or more color correspondences between the pixels of the plurality of pixels and the one or more color similarity regions; and
   classify the object as the first color having a first color name of the plurality of colors based on the one or more color-matching scores.

2. The non-transitory computer-readable medium of claim 1, further comprising instructions that, when executed by the at least one processor, cause the computing device to downsample the plurality of pixels before generating the one or more color-matching scores for the object.

3. The non-transitory computer-readable medium of claim 1, further comprising instructions that, when executed by the at least one processor, cause the computing device to generate a second color similarity region corresponding to a second color by grouping one or more additional alternative versions of the second color and the second color together within the multidimensional color space.

4. The non-transitory computer-readable medium of claim 3, further comprising instructions that, when executed by the at least one processor, cause the computing device to generate an alternative version of the first color by:
   converting the first color from a first color model corresponding to the multidimensional color space to a second color model;
   modifying one or more color attributes of the first color within the second color model; and
   converting the first color with the modified one or more color attributes from the second color model back to the first color model corresponding to the multidimensional color space.

5. The non-transitory computer-readable medium of claim 4, wherein the one or more color attributes of the first color modified within the second color model comprise a color brightness, a color hue, or a color saturation level.

6. The non-transitory computer-readable medium of claim 4, wherein the instructions, when executed by the at least one processor, cause the computing device to modify the one or more color attributes of the first color within the second color model by reducing a brightness level of a first color copy in the second color model.

7. The non-transitory computer-readable medium of claim 3, wherein a first color similarity region for the first color comprises a first color point for the first color and a plurality of mapped alternative color points for the first color mapped to the multidimensional color space.

8. The non-transitory computer-readable medium of claim 7, wherein the instructions, when executed by the at least one processor, cause the computing device to generate a first color-matching score for the object based on determining distances in the multidimensional color space between each of the pixels of the plurality of pixels of the object and each of the plurality of alternative mapped color points and the first color point.

9. The non-transitory computer-readable medium of claim 7, further comprising instructions that, when executed by the at least one processor, cause the computing device to:
   assign a pixel as valid based on the pixel being within a minimum threshold distance to at least one of the plurality of mapped color points corresponding to the first color or to the first color point; and
   determine that the object matches the first color based on identifying a minimum percentage of pixels of the object being assigned as valid.

10. The non-transitory computer-readable medium of claim 1, further comprising instructions that, when executed by the at least one processor, cause the computing device to:
   receive a search request for the object having the first color;
   detect a plurality of digital images that include the object;
   generate a color-matching score for the object detected within each of the plurality of digital images with respect to the first color;
   identify a subset of digital images of the plurality of digital images that comprise the object with a color-matching score satisfying a minimum color-matching threshold for the first color; and provide the subset of digital images in response to the search request.

11. The non-transitory computer-readable medium of claim 1, further comprising instructions that, when executed by the at least one processor, cause the computing device to:
detect a plurality of instances of the object within the digital image;
generate a color-matching score for each instance of the object;
classify one or more instances of the object to the first color based on the color matching scores; and
return the one or more instances of the object as having the first color.

12. The non-transitory computer-readable medium of claim 1, further comprising instructions that, when executed by the at least one processor, cause the computing device to:
receive a query request for the object indicating the first color by a color name;
identify, in response to the query request indicating the color name of the first color, a color similarity region for a first color within the multidimensional color space that is pre-mapped to a first color name; and
return, in response to identifying the color similarity region for a first color within the multidimensional color space, an indication that object in the digital image matches the first color based on the object being classified as the first color.

13. The non-transitory computer-readable medium of claim 1, further comprising instructions that, when executed by the at least one processor, cause the computing device to identify the object in the digital image utilizing an object detection neural network.

14. A system for classifying objects in digital images based on color, the system comprising:
one or more memory devices comprising a multidimensional color space for a plurality of colors comprising a plurality of color similarity regions each associated with a color label, the multidimensional color space comprising a first color similarity region associated with a first color label that groups regions of one or more alternative versions of a first color and a region of the first color within the multidimensional color space; and
at least one server device configured to cause the system to:
identify an object in a digital image comprising a plurality of pixels;
map pixels of the plurality of pixels to the multidimensional color space to determine correspondences to one or more color similarity regions of the plurality of color similarity regions and corresponding to one or more color labels;
generate one or more color-matching scores for the object based on the one or more color correspondences between the pixels of the plurality of pixels and the one or more color similarity regions; and
classify the object as the first color having a first color label of the plurality of colors based on the one or more color-matching scores.

15. The system of claim 14, wherein the at least one server device is further configured to generate the first color similarity region for the first color by grouping one or more alternative versions of the first color and the first color together within the multidimensional color space.

16. The system of claim 15, wherein the at least one server device is further configured to cause the system to generate an alternative version of the first color by:
converting the first color from a first color model corresponding to the multidimensional color space to a second color model;
modifying one or more color attributes of the first color within the second color model; and
converting the first color with the modified one or more color attributes from the second color model back to the first color model corresponding to the multidimensional color space.

17. The system of claim 16, wherein a first color similarity region for the first color comprises a first color point for the first color and a plurality of mapped alternative color points for the first color mapped to the multidimensional color space.

18. The system of claim 17, wherein the at least one server device is further configured to cause the system to generate a first color-matching score for the object based on determining distances in the multidimensional color space between each of the pixels of the plurality of pixels of the object and each of a plurality of alternative mapped color points and the first color point.

19. A computer-implemented method of classifying objects as a color, comprising:
generating a multidimensional color space for a plurality of colors comprising a plurality of color similarity regions each associated with a color name, the multidimensional color space comprising a first color similarity region associated with a first color name that groups regions of one or more alternative versions of a first color and a region of the first color within the multidimensional color space;
identifying a first object in a digital image comprising a first plurality of pixels;
identifying a second object in the digital image comprising a second plurality of pixels that have different color values than the first plurality of pixels;
map pixels of the first plurality of pixels to the multidimensional color space to determine a first set of color correspondences to a first set of color similarity regions of the plurality of color similarity regions and corresponding to a first set of one or more color names;
map pixels of the second plurality of pixels to the multidimensional color space to determine a second set of color correspondences a second set of color similarity regions of the plurality of color similarity regions and corresponding to a second set of one or more color names;
generate a first set of color-matching scores for the first object based on the first set of color correspondences between the first plurality of pixels and the first set of color similarity regions;
generate a second set of color-matching scores for the second object based on the second set of color correspondences between the second plurality of pixels and the second set of color similarity regions;
classify the first object as the first color having a first color name of the plurality of colors based on the first set of color-matching scores; and
classify the second object as the first color having the first color name of the plurality of colors based on the second set of color-matching scores.

20. The computer-implemented of claim 19, further comprising downsampling the first and second plurality of pixels before generating the first and second sets of color-matching scores for the first and second objects.

* * * * *